(12) United States Patent
Yang et al.

(10) Patent No.: US 9,607,352 B2
(45) Date of Patent: Mar. 28, 2017

(54) PREDICTION BASED PRIMITIVE SORTING FOR TILE BASED RENDERING

(71) Applicant: INTEL CORPORATION, Santa Clara, CA (US)

(72) Inventors: Yi Yang, Shanghai (CN); Xiaoming Chen, Shanghai (CN); Feng Chen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 14/559,026

(22) Filed: Dec. 3, 2014

(65) Prior Publication Data

US 2016/0163014 A1 Jun. 9, 2016

(51) Int. Cl.
G06T 1/20 (2006.01)
G06T 1/60 (2006.01)
G06T 15/00 (2011.01)
G06T 11/40 (2006.01)

(52) U.S. Cl.
CPC ............ G06T 1/20 (2013.01); G06T 1/60 (2013.01); G06T 11/40 (2013.01); G06T 15/005 (2013.01)

(58) Field of Classification Search
None
See application file for complete search history.

(56) References Cited

U.S. PATENT DOCUMENTS

| 6,380,935 B1* | 4/2002 | Heeschen ............. G06T 15/005 345/423 |
| 8,854,364 B1 | 10/2014 | Voorhies |
| 2010/0328303 A1 | 12/2010 | Akenine-Moller et al. |
| 2013/0257885 A1 | 10/2013 | Vaidyanathan et al. |
| 2014/0226722 A1* | 8/2014 | Izvorski ................. G06T 9/001 375/240.14 |
| 2014/0267259 A1* | 9/2014 | Frascati ................ G06T 15/005 345/423 |
| 2014/0292782 A1* | 10/2014 | Fishwick .................. G06T 1/20 345/522 |
| 2015/0287233 A1* | 10/2015 | Shin ...................... G06T 15/005 345/419 |

FOREIGN PATENT DOCUMENTS

KR 1020140098133 8/2014

OTHER PUBLICATIONS

International Search Report & Written Opinion, mailed Feb. 3, 2016 for PCT/US15/56715.

* cited by examiner

*Primary Examiner* — Yingchun He
(74) *Attorney, Agent, or Firm* — Green, Howard & Mughal, LLP

(57) ABSTRACT

Techniques related to graphics rendering are discussed. Such techniques may include predicting primitive intersection information for tiles of a frame, rendering the frame on a tile-by-tile basis based on the predicted primitive intersection information, and re-rendering any tiles with predicted primitive errors.

22 Claims, 10 Drawing Sheets

PREDICTION BASED PRIMITIVE SORTING FOR TILE BASED RENDERING

TECHNICAL FIELD

Embodiments of the invention generally relate to tile based rendering and more particularly relate to a prediction based primitive sorting architecture for tile based rendering.

BACKGROUND

In some tile based rendering architectures, a parameter buffer may store intermediate results from a geometry stage. The intermediate results may include screen positions, texture coordinates, and other variables associated with primitives. Without such a parameter buffer, the primitives that cover several tiles need to be rendered repeatedly. Such repeated rendering may waste computational resources and provided increased memory traffic.

However, as tile sizes are increased, the primitives that cover multiple tiles may be reduced to a level such that the parameter buffer may be removed. Such removal of the parameter buffer may advantageously save on memory size and traffic. For example, fewer primitives would cover more than one tile and such repeated rendering may be reduced to an acceptably efficient level. Such tile size increases may allow for a parameter buffer free architecture which, as the name suggests, may not include a parameter buffer. In such parameter buffer free architectures, to improve the efficiency of rendering, a two pass vertex rendering flow may be implemented. The first pass may determine the position of primitives and sort them to tiles (e.g., indicating which primitives are overlapping particular tiles). The second pass may perform complete vertex shading (e.g., again including position calculation) on a tile-by-tile basis. In such architectures, though the first pass has already performed position computations for primitives (e.g., to sort them to tiles), the computed positions would not be kept since there is no parameter buffer. Therefore, such an architecture may lead to duplicated position computations in the second pass. For example, the vertex data of primitives may need to be loaded twice and the position data may need to be calculated twice. Such repeated calculations may be inefficient, wasting computational resources and providing increased memory traffic.

As such, existing techniques may not provide efficient graphics rendering implementations. Such problems may become critical as the desire to utilize graphics rendering for video games, simulators, movie effects, computer modeling programs, and the like becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
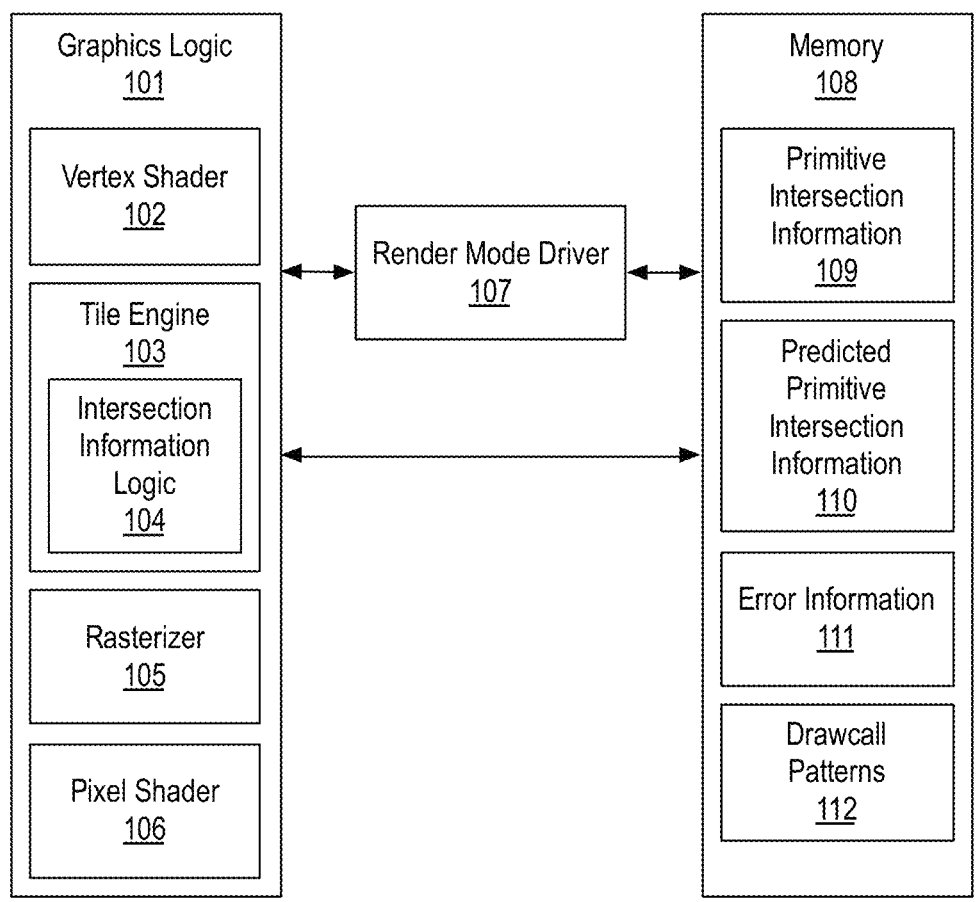
FIG. 1 is an illustrative diagram of an example system for providing graphic rendering.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, computing architectures, and articles are described herein related to graphics rendering and, in some examples, to prediction based primitive sorting for tile based rendering.

As described above, in some graphics architectures, a parameter free buffer architecture may be implemented. In such parameter free buffer architectures, a two pass vertex rendering flow may be implemented, which may require duplicative loading of vertex data of primitives and calculations of position data. In some embodiments discussed herein, predicted primitive intersection information may be generated or updated based on a frame. The predicted primitive intersection information may then be used for a subsequent frame to predict which primitives overlap particular tiles in the frame. Such predicted primitive intersection information may eliminate the need for a pass of loading vertex data of primitives and position determination prior to full vertex shading operations on a tile-by-tile basis. Such techniques may save substantial computational resources and memory traffic.

In some examples, the predicted primitive intersection information may be incorrect for one or more tiles of a frame. As is discussed further herein, the correct intersection information may be determined for the tiles of the frame during the vertex shading operations and any incorrectly predicted tiles may be re-rendered as needed. Also, such correct intersection information may be used for prediction of subsequent frames (e.g., for the generation of predicted primitive intersection information for a subsequent frame) as is discussed further herein.

Furthermore, some frames and, advantageously, most frames, may be processed in a prediction mode such that predicted primitive intersection information is used (as discussed) or frames may be processed in an initialization mode. For example, the initialization mode may be used for a first frame or scene change frames (e.g., for frames where predicted primitive intersection information would be highly inaccurate). The initialization mode may provide two passes (e.g., since predicted primitive intersection information is not available or not useful) with the first pass providing sorting of primitives on a tile basis prior to full vertex shading operations. In some examples, such sorting of primitives may be used to generate predicted primitive intersection information for a subsequent frame by copying the current sorting. In other examples, predicted primitive intersection information may be generated based on a conservative estimate of overlap in subsequent frames using bounding boxes around tiles of the current frame, as is discussed further herein.

For example, graphics rendering techniques discussed herein may include receiving predicted primitive intersection information associated with at least a tile of a frame such that the predicted primitive intersection information indicates one or more primitives predicted to overlap the tile and rendering the tile based at least in part on the predicted primitive intersection information. In some examples, logic, such as graphics logic implemented at least partially in hardware logic, may be configured to receive predicted primitive intersection information associated with at least a tile of a frame such that the predicted primitive intersection information indicates one or more primitives predicted to overlap the tile and to render the tile based at least in part on the predicted primitive intersection information.

As discussed, some embodiments may provide prediction based primitive sorting for tile based rendering. As used herein, a tile may refer to a portion of a scene or frame under consideration for processing by graphics logic (e.g., for graphics processing, rendering, etc.). The graphics logic may include a GPU (Graphics Processing Unit) or other types of logic that perform computation(s) relating to graphics task(s), such as operation(s) that manipulate an image, frame, scene, etc., as will be further discussed herein. While some embodiments are discussed with reference to graphics logic, embodiments are not limited to graphics related logic and may be also applied to other types of non-graphic (e.g., general purpose) logic. Moreover, various embodiments may be performed for any type of computing device such as a desktop computer, a mobile computer (such as a smartphone, tablet, UMPC (Ultra-Mobile Personal Computer), laptop computer, Ultrabook™ computing device, smart watch, smart glasses, etc.), a work station, etc., which may be embodied on a SoC (System On Chip) platform in an embodiment.

Furthermore, the scenes, images, or frames discussed herein (e.g., which may be processed by the graphics logic) may be captured by an image capture device (such as a digital camera that may optionally be embedded in another device such as a smart phone, a tablet, a laptop, or the like, or an analog device whose captured images are subsequently converted to digital form). In other examples, the scenes, images, or frames discussed herein may be generated by art design, game design, or any kind of 3D/2D (two dimensional/three dimensional) industry design. For example, a scene may refer to a set of geometry structures and related texture maps, lighting effects, and the like. In some examples, frame of a scene are designed/generated on a computer. Furthermore, one or more frames of a scene may be presented via a display device.

FIG. 1 is an illustrative diagram of an example system 100 for providing graphic rendering, arranged in accordance with at least some implementations of the present disclosure. As shown in FIG. 1, system 100 may include graphics logic 101, a render mode driver 107, and a memory 108. Furthermore, graphics logic 101 may include a vertex shader 102, a tile engine 103 having intersection information logic 104, a rasterizer 105, and a pixel shader 106. Although not shown for the sake of clarity of presentation, graphics logic 101 may also include one or more of a command processor, a hull shader, a tessellator, a domain shader, a geometry shader, culling logic, or backend render logic, or the like. In some examples, graphics logic 101 may provide or implement a graphics pipeline. Also as shown, memory 108 may store primitive intersection information 109, predicted primitive intersection information 110, error information, 111, and drawcall patterns 112. As is discussed further herein, drawcall patterns 112 may be used by render mode driver 107 to determine a mode of operation for a frame. Although discussed herein in some examples with respect to drawcall patterns 112, render mode driver 107 may use other frame attributes to determine the mode of operation such as texture information or the like. In such examples, memory 108 may store such attributes. Furthermore, although not shown for the sake of clarity of presentation, memory 108 may store other graphics data such as vertex data, index data, constants, texture data, render target data, previous or current frames, or the like.

As is discussed further herein, vertex shader 102 and/or intersection information logic 104 of tile engine 103 may generate primitive intersection information 109 for a frame. For example, primitive intersection information 109 may include the spatial relationship between tiles and primitives such as a table listing tiles and the primitives that cover or overlap the tiles. Such spatial relationship information and tables are discussed further herein with respect to FIGS. 6 and 7 for example. In some examples, primitive intersection information 109 may represent the spatial relationship between tiles and primitives for a current or previous frame based on position information for primitives determined via vertex shader 102 (e.g., either via full vertex shading or partial vertex shading) and the sorting of primitives to tiles via intersection information logic 104 of tile engine 103. For example, primitive intersection information 109 may include actual (e.g., non-predicted) spatial relationships between tiles and primitives for a frame such as a current frame.

In an initialization mode, for example, location information of primitives for use in generating primitive intersection information 109 may be generated via a first pass operation of vertex shading via vertex shader 102. Such location information may be used by intersection information logic 104 to generate primitive intersection information 109. In such an initialization mode, in a second pass operation of vertex shading via vertex shader 102, rasterization via rasterizer 105, pixel shading via pixel shader 106, and/or other operations, tiles of the current frame may be rendered on a tile-by-tile basis using primitive intersection information 109. For example, for an individual tile, primitives indicated as overlapping the individual tile may be processed by vertex shader 102 to perform full vertex shading. The individual tile may then be rasterized and pixel shaded to generate a rendered tile. All tiles of the frame may be processed in such a tile-by-tile manner to generate a rendered frame.

Furthermore, in such an initialization mode, graphics logic 101 may generate predicted primitive intersection information 110 for a subsequent frame. Predicted primitive intersection information 110 may also provide the spatial relationship between tiles and primitives such as a table listing tiles and the primitives that cover or overlap the tiles. In some examples, predicted primitive intersection information 110 may be the same as primitive intersection information 109 such that a subsequent frame may use the spatial relationship information of a current frame as its predicted spatial relationship information. Such examples may offer the advantage of ease of implementation at the cost of increased prediction errors (and increased re-rendered tiles). In other examples, predicted primitive intersection information 110 may be based on the overlap of primitives of the current frame based on bounding boxes around the individual tiles. Such examples are discussed further herein and, in particular, with respect to FIG. 7. Such prediction techniques may offer a more conservative estimate of primitives that will overlap a tile in a subsequent frame as primitives move between frames. In some examples, such conservative prediction techniques may overestimate the number of primitives overlapping the tile, but such primitives may be removed during standard culling operations. Such techniques may offer the advantage of reduced prediction errors and fewer re-rendered tiles.

In either case, a subsequent frame may be processed in a prediction mode such that predicted primitive intersection information 110 may be used to predict the spatial relationship information for the frame. Such spatial relationship information may be stored via memory 108 and may be fetched on a per frame basis (e.g., before rendering the frame) or on a per tile basis (e.g., as the tiles of the frame are rendered). For example, predicted primitive intersection information 110 may occupy a relatively small amount of memory space of memory 108. As discussed, the implementation of predicted primitive intersection information 110 may thereby eliminate a first pass of determining primitives position data (e.g., via vertex shader 102 as discussed with respect to the initialization mode of operation), which may save on computational resources and memory transactions.

Based on predicted primitive intersection information 110, tiles of the current frame may be rendered on a tile-by-tile basis as discussed (e.g., vertex shading via vertex shader 102, rasterization vi rasterizer 105, pixel shading via pixel shader 106, and the like). Furthermore, during vertex shading, actual intersection information may be generated. Based on the actual intersection information, tiles having errors may be flagged and stored as error information 111, and the predicted primitive intersection information may be updated for a subsequent frame (such generation of updated predicted primitive intersection information for a subsequent frame may include bounding box techniques as discussed). Tiles having errors (e.g., tiles having one or more primitives overlapping them that were not predicted) may be re-rendered. For example, a tile having even one missing primitive in predicted primitive intersection information 110 may need to be re-rendered in its entirety. When all tiles have been rendered (and re-rendered as needed), the frame may be assembled for display or transmission to a user or the like.

As discussed herein, the terms primitive intersection information and/or predicted primitive intersection information may include spatial relationship information between tiles and primitives for any number of tiles (e.g., one or more tiles) and/or for any number of frames. For example, primitive intersection information 109 and/or predicted primitive intersection information 110 may include information for all tiles and primitives of a frame but, in some examples, primitive intersection information and/or predicted primitive intersection information may be fetched or retrieved only for one tile or some tiles of a frame. Furthermore, as such information is fetched, it may be erased or replaced with other information if it is no longer needed. In such examples, portions of memory allocated to primitive intersection information 109 and/or predicted primitive intersection information 110 may be considered buffers.

Figure 5:
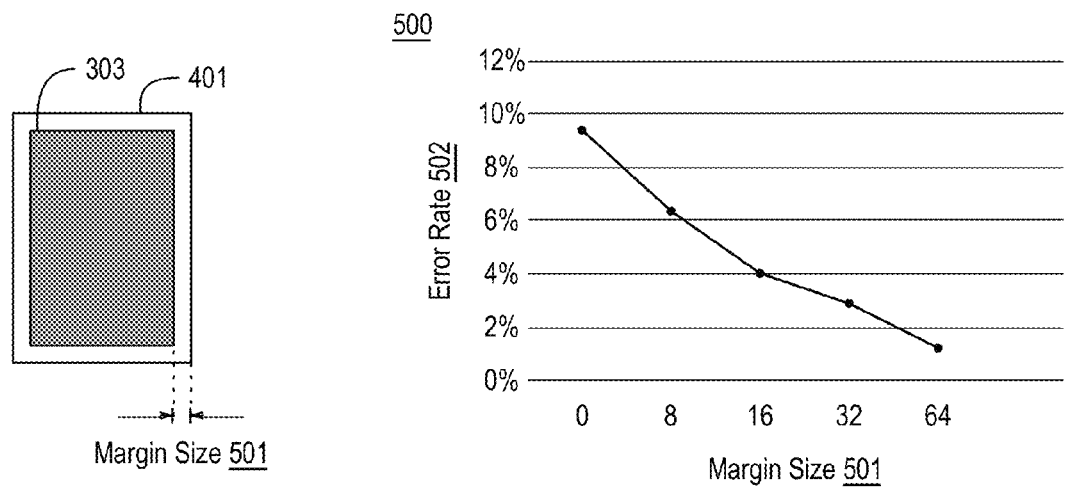
FIG. 5 illustrates an example margin size for a bounding box and an example chart of error rate versus margin size.

As discussed, a frame may be operated in an initialization mode or a prediction mode as is discussed further herein with respect to FIG. 5. For example, render mode driver 107 may determine a mode for a frame from one of an initialization mode or a prediction mode. A first frame in processing may be processed in the initialization mode (e.g., since no predicted primitive intersection information is available for such a frame). For subsequent frames, render mode driver 107 may determine the mode based on a comparison of attribute(s) between frames. For example, the attribute(s) may include one or more of texture information, error information 111, or drawcall patterns 112. For example, attribute(s) between frames may be compared to determine if the subsequent frame is a scene change frame. If the subsequent frame is determined to be a scene change frame it may be processed in the initialization mode (e.g., since predicted primitive intersection information 110 may be highly inaccurate due to the scene change). In some examples, a difference in attributes may be determined and compared to a threshold value to determine whether the subsequent frame is a scene change frame.

System 100 may be implemented via any suitable device such as a computer, a laptop, an ultrabook, a tablet, a smartphone, a smart watch, smart glasses, or the like. In some examples, system 100 may be considered a computer or graphics architecture or platform for implementing prediction based primitive sorting for tile based rendering. In an example, graphics logic 101 may be implemented via a graphics processing unit such that the graphics processing unit includes graphics logic 101. In some examples, the graphics processing unit may be a tile based rendering graphics processing unit. Furthermore, in some examples, render mode driver 107 may be implemented via a central processing unit coupled to the graphics processing unit. In an example, the graphics processing unit and the central processing unit may be implemented in a system on a chip (SoC) package. For example, the SoC may be a low power SoC implementation. In some examples, system 100 may be implemented via a heterogeneous processing platform such as a heterogeneous parallel processing platform. As discussed, system 100 may provide a parameter buffer free tile based graphics system such as a 3D parameter buffer free tile based graphics processing unit.

Figure 2:
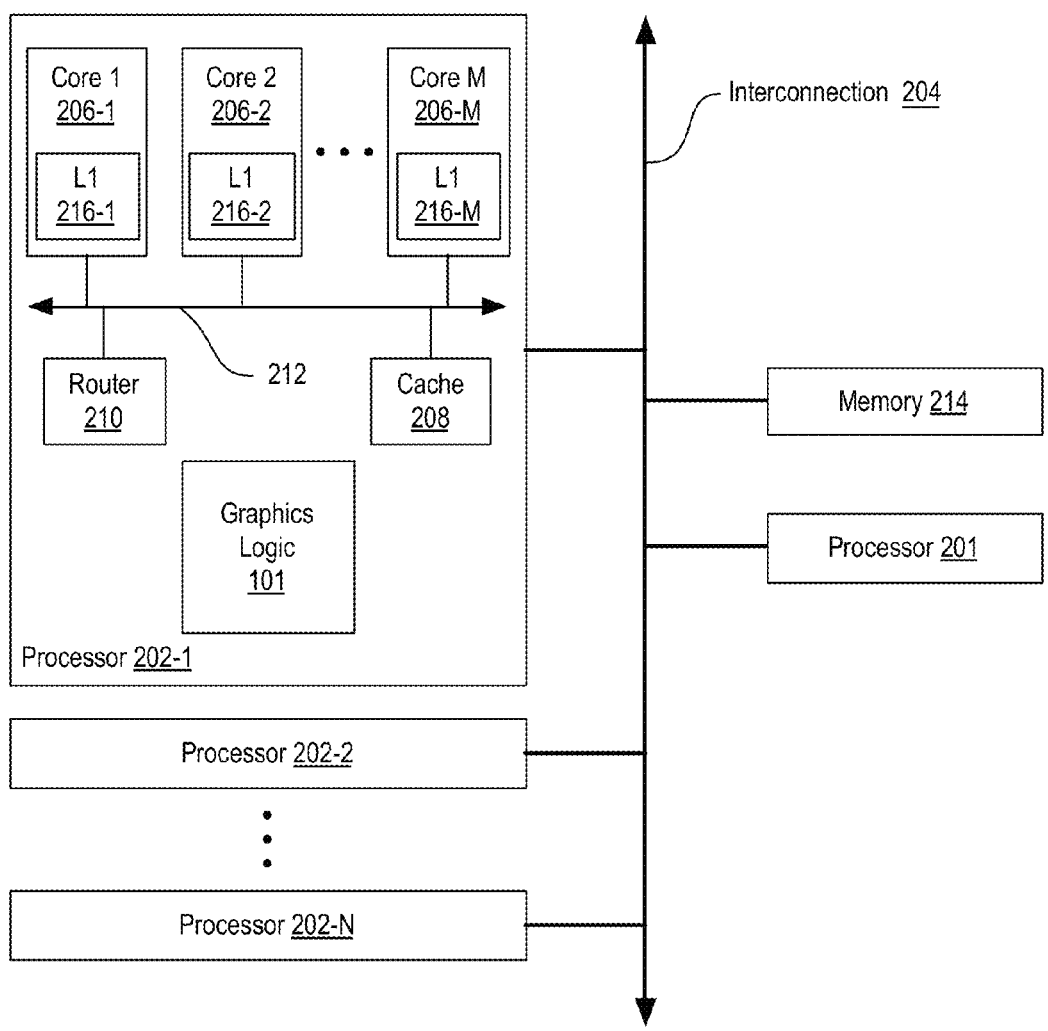
FIG. 2 illustrates a block diagram of an example computing platform.

FIG. 2 illustrates a block diagram of an example computing platform 200, arranged in accordance with at least some implementations of the present disclosure. Platform 200 may include one or more processors 202-1 through 202-N (e.g., referred to as processors 202). Processors 202 may be general-purpose central processing units (CPUs) and/or graphics processing units (GPUs) in various embodiments. In some examples, processors 202 may be considered process units or compute devices of platform. For example, platform 200 may support a heterogeneous parallel processing platform. As shown, processors 202 may communicate via an interconnection or bus 204. Furthermore, one, some, or all of processors 202 may include various components such as those illustrated with respect to processor 202-1. For example, one, some, or all of processors 202 may include the same or similar components as those discussed with respect to processor 202-1.

As shown, processor 202-1 may include one or more processor cores 206-1 through 206-M (e.g., referred to as cores 206), a cache 208, and/or a router 210. In an example, processor cores 206 may be implemented on a single integrated circuit (IC) chip. Furthermore, as shown, the chip may include one or more shared and/or private caches such as cache 208, buses or interconnections such as a bus or interconnection 212, graphics and/or memory controllers (such as those discussed with reference to FIGS. 10-12) or other components. For example, cores 206 may be considered compute resources or compute units of processor 202-1. In some examples, router 210 may provide communication between components of processor 202-1 and/or platform 200.

Cache 208 may store data (e.g., including instructions) that may be used by one or more components of processor 202-1 such as cores 206. For example, cache 208 may locally cache data from memory 214 for faster access by the components of processor 202-1 such as cores 206. In some examples, cache 208 may provide a global and/or constant memory cache and cache 208 may be accessed by cores 206 and/or processor 201. In an embodiment, cache 208 may be a mid-level cache (MLC), a last level cache (LLC), or the like. Furthermore, as shown, each of cores 206 may include a level 1 (L1) cache (e.g. L1 216-1, L1 216-2, L1 216-M; referred to herein as L1 caches 216) or other levels of cache such as a level 2 (L2) cache or the like. L1 caches 216 may provide private or local memory for their respective cores 206. Furthermore, various components of processor 202-1 may communicate with the cache 208 directly, through interconnection 212 and/or a memory controller or hub (not shown).

As shown in FIG. 2, processor 202 may further include graphics logic 101 to perform various graphics related operations such as those discussed herein. Graphics logic 101 may have access to one or more memory devices such as cache 208, one or more of L1 caches 216, memory 214, register(s), or another memory in platform 200 to store information relating to operations of the graphics logic 101 such as primitive intersection information 109, predicted primitive intersection information 110, error information 111, and/or drawcall patterns 112. Furthermore, while graphics logic 101 is illustrated inside processor 202-1, graphics logic 101 may be located elsewhere in platform 200 in various embodiments. For example, graphics logic 101 may be implemented via one or more of cores 206, one or more of processors 202, and/or via processor 201, or the like. For example, graphics logic 101 may be implemented via a heterogeneous computing system via platform 200. As discussed, in some examples, graphics logic 101 may include one or more of vertex shader 102, tile engine 103 having intersection information logic 104, rasterizer 105, pixel shader 106, and or other logic or components. Such logic or components of graphics logic 101 may be implemented in any manner via platform 200. For example, such logic or components may be distributed among processors 202 and/or cores of processors 202 such as cores 206 of processors 202. Platform 200 may implement any circuitry or logic and/or platform 200 may be configured to implement any technique or techniques as discussed herein. Furthermore, although not shown in FIG. 2, render mode driver 107 may similarly be implemented via one or more of cores 206, one or more of processors 202, and/or via processor 201, or the like.

Figure 3:
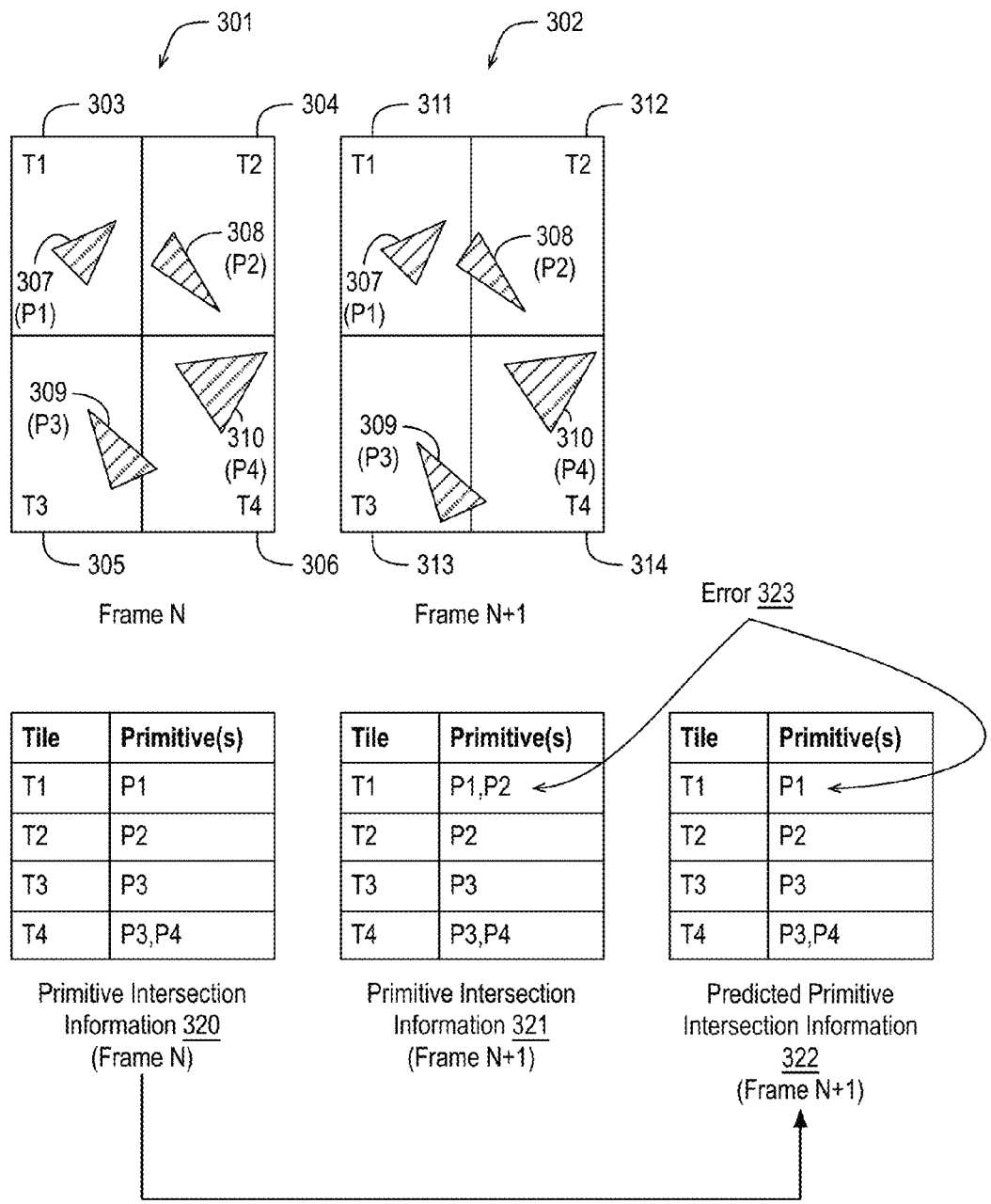
FIG. 3. is a diagram illustrating example tiles of example frames and example primitive intersection information.
Figure 4:
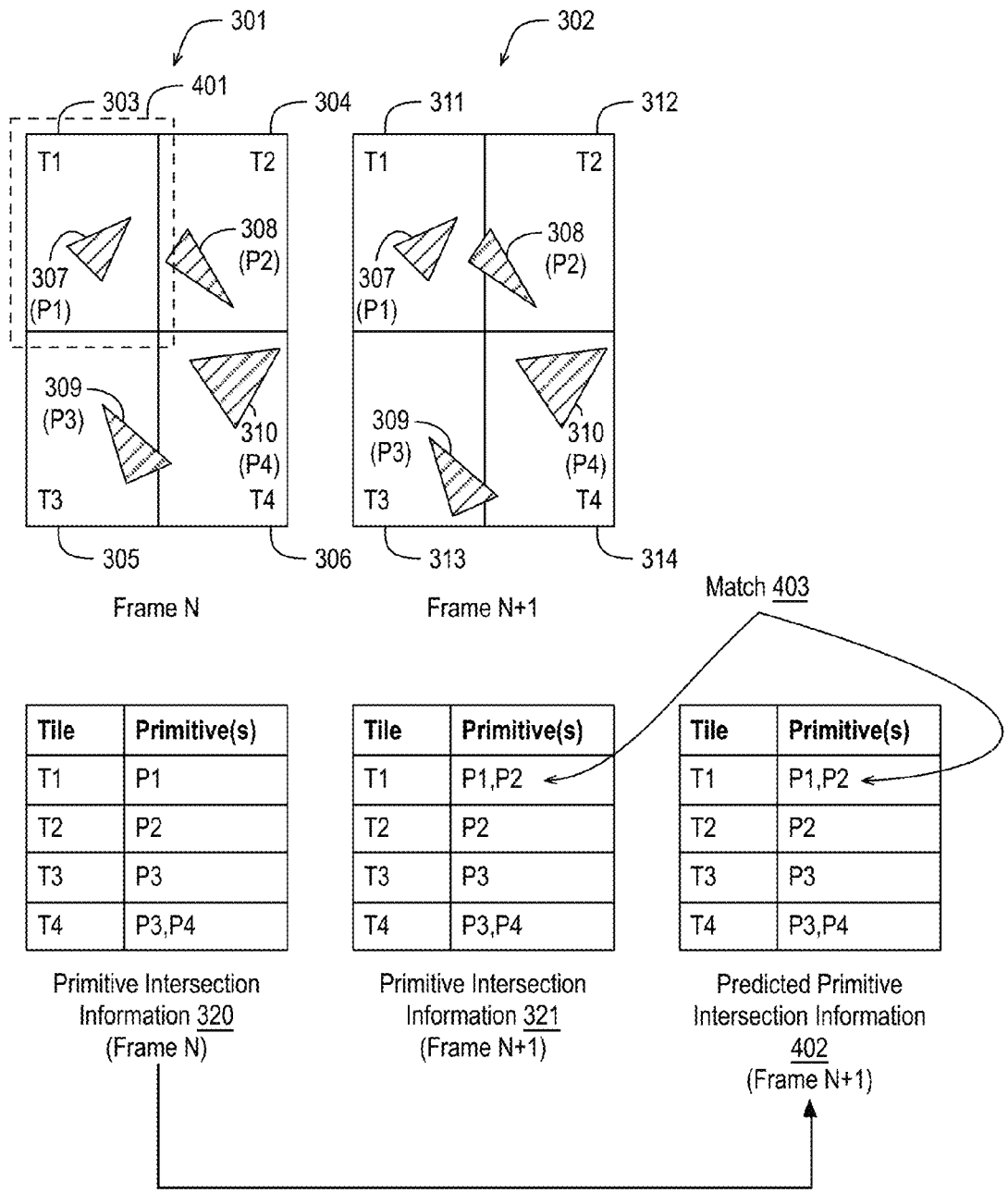
FIG. 4. is a diagram illustrating example tiles of example frames and example primitive intersection information.

FIG. 3. is a diagram illustrating example tiles of example frames and example primitive intersection information, arranged in accordance with at least some implementations of the present disclosure. As shown, FIG. 3 illustrates example frame 301 and example frame 302 or portions thereof. For example, frame 302 may be subsequent to frame 301 in a scene such that frame 301 is frame N and frame 302 is frame N+1 of a scene. Furthermore, as shown, frame 301 may include four tiles 303-306 (also labeled as T1, T2, T3, and T4) and four primitives 307-310 (also labeled as P1, P2, P3, and P4). Although illustrated with four tiles and four primitives for the sake of clarity of presentation, frames 301,302 may include any number of tiles and any number of primitives. Furthermore, the examples of FIGS. 3 and 4 illustrate a grid of tiles. However, other tile structures such as adaptive tile structures having any shape and/or size may be used. Furthermore, any tile size or sizes may be implemented such as a tile size of 256×256 or tile sizes of about 100×100 pixels to 500×500 pixels depending on the graphics processing architecture. Also, although discussed with respect to two frames of a scene, any number of frames and/or scenes may be processed using the techniques discussed herein. For example, adjacent frames of the same scene may often be similar with the positions of objects (e.g., represented by primitives) changing little between frames. Such relative similarity between frames of a scene may be exploited to save computational and memory resources as discussed herein.

As shown, primitive intersection information 320 may be generated for frame 301 (e.g., frame N) based on tiles 303-306 and primitives 307-310. For example, location data for primitives 307-310 (e.g., vertex location information) may be generated via vertex shader 102 of graphics logic 101. In some examples, generating location data for primitives 307-310 may include full vertex shading and, in other examples, generating location data for primitives 307-310 may include partial vertex shading (e.g., only determining vertex positions) or other operations. Based on the location data for primitives 307-310 and the location data for tiles 303-306 (e.g., which may be standardized or determined based on rendering settings, display settings, or the like), primitive intersection information 320 may be generated. For example, primitive intersection information 320 may be generated via intersection information logic 104 of tile engine 103 or other logic of tile engine 103 or graphics logic 101. As shown, primitive intersection information 320 may include spatial relationship information between tiles 303-306 and primitives 307-310. As shown, in some examples, primitive intersection information 320 may be provided as a table (e.g., a table listing tiles and primitives covering those tiles) although primitive intersection information 320 may include any suitable data structure. As shown, primitive intersection information 320 may include a listing of tiles 303-306 (labeled as tiles T1-T4 in the table) and corresponding overlapping primitives of primitives 307-310. For example, for tile 303 (T1) only primitive 307 (P1) is overlapping, for tile 304 (T2) only primitive 308 (P3) is overlapping, for tile 305 (T3) only primitive 309 (P3) is overlapping, and for tile 306 (T4) primitives 309 (P3) and 310 (P4) are overlapping. Such information is reflected in primitive intersection information 320. As shown with respect to primitive 309, a primitive may overlap with one or more tiles (e.g., 1, 2, 3, or 4 tiles if the tiles are organized in a grid as shown).

As discussed, in an initialization mode, primitive intersection information 320 may be generated during a first pass of vertex shading such that primitives may be sorted in a tile manner. In a prediction mode, primitive intersection information 320 may be generated during an only pass of vertex shading (e.g., during rendering on a tile-by-tile basis) and sorting in a tile manner. In either event, primitive intersection information 320 may represent actual (e.g., non-predicted) intersection information for tiles 303-306 of frame 301.

As shown in FIG. 3, predicted primitive intersection information 322 may be determined or generated based on primitive intersection information 320. In the example of FIG. 3, predicted primitive intersection information 322 may be the same as primitive intersection information 320. For example, predicted primitive intersection information 322 may be generated via intersection information logic 104 of tile engine 103 or other logic of tile engine 103 or graphics logic 101. Such a technique may offer ease of implementation at the cost of increased errors.

For example, FIG. 3 illustrates primitive intersection information 321 for frame 302 (e.g., frame N+1) based on tiles 303-306 and primitives 307-310, which may be generated as discussed with respect to primitive intersection information 320. As shown, primitive intersection information 321 may include spatial relationship information between tiles 311-314 and primitives 307-310. As shown, in some examples, primitive intersection information 321 may be provided as a table (e.g., a table listing tiles and primitives covering those tiles) although primitive intersection information 321 may include any suitable data structure. As shown, primitive intersection information 321 may include a listing of tiles 311-314 (labeled as tiles T1-T4 in the table) and corresponding overlapping primitives of primitives 307-310. As shown, primitives 307-310 may move between frames as shown via movement of primitives 308 and 309 in FIG. 3. Although not shown in FIG. 3 for the sake of clarity of presentation, new primitives may be included in frame 302 and/or some primitives may be lost. For example, as shown, for tile 311 (T1) primitives 307 (P1) and 308 (P2) are overlapping, for tile 312 (T2) only primitive 308 (P3) is overlapping, for tile 313 (T3) only primitive 309 (P3) is overlapping, and for tile 314 (T4) primitives 309 (P3) and 310 (P4) are overlapping. Such information is reflected in primitive intersection information 321.

As discussed, in a prediction mode, predicted primitive intersection information 322 may be used to indicate which primitives are to be rendered for individual tiles. Such rendering may include vertex shading and, as discussed, such predicted primitive intersection information 322 may be updated or corrected for the current frame and/or for subsequent frame prediction. In the case of an error where a primitive was not included for a tile, such a primitive may be detected during the updating of predicted primitive intersection information 322 and, after the initial rendering of all tiles, the tile or tiles having missing (e.g., non-predicted primitives) may be re-rendered. In the example of FIG. 3, an error 323 may occur at tile 311 (T1) such that predicted primitive intersection information 322 did not indicate primitive 308 (P2) would overlap with tile 311 (T1). For example, error 323 may be stored in error information 111 and error 323 may cause a re-rendering of tile 311.

As discussed with respect to FIG. 3, predicted primitive intersection information for a frame may be the same as actual primitive intersection information from a previous frame. In other examples, a more conservative prediction technique may be used.

FIG. 4. is a diagram illustrating example tiles of example frames and example primitive intersection information, arranged in accordance with at least some implementations of the present disclosure. As shown, FIG. 4 illustrates example frame 301 and example frame 302 or portions thereof. For example, frame 302 may be subsequent to frame 301 in a scene such that frame 301 is frame N and frame 302 is frame N+1 of a scene. As discussed with respect to FIG. 3, frame 301 may include four tiles 303-306 (also labeled as T1, T2, T3, and T4) and four primitives 307-310 (also labeled as P1, P2, P3, and P4).

As discussed with respect to FIG. 3, primitive intersection information 320 may be generated for frame 301 (e.g., frame N) based on tiles 303-306 and primitives 307-310. As shown, primitive intersection information 320 may include spatial relationship information between tiles 303-306 and primitives 307-310. As shown, in some examples, primitive intersection information 320 may be provided as a table (e.g., a table listing tiles and primitives covering those tiles) although primitive intersection information 320 may include any suitable data structure. As discussed, primitive intersection information 320 may include a listing of tiles 303-306 (labeled as tiles T1-T4 in the table) and corresponding overlapping primitives of primitives 307-310. For example, for tile 303 (T1) only primitive 307 (P1) is overlapping, for tile 304 (T2) only primitive 308 (P3) is overlapping, for tile 305 (T3) only primitive 309 (P3) is overlapping, and for tile 306 (T4) primitives 309 (P3) and 310 (P4) are overlapping. Such information is reflected in primitive intersection information 320. As shown with respect to primitive 309, a primitive may overlap with one or more tiles (e.g., 1, 2, 3, or 4 tiles if the tiles are organized in a grid as shown).

As discussed, in an initialization mode, primitive intersection information 320 may be generated during a first pass of vertex shading such that primitives may be sorted in a tile manner. In a prediction mode, primitive intersection information 320 may be generated during an only pass of vertex shading (e.g., during rendering on a tile-by-tile basis) and sorting in a tile manner. In either event, primitive intersection information 320 may represent actual (e.g., non-predicted) intersection information for tiles 303-306 of frame 301.

As shown in FIG. 4, predicted primitive intersection information 402 may be determined or generated based on primitives 307-310 and bounding boxes around tiles 303-306 such as bounding box 401 around tile 303. In FIG. 4, only bounding box 401 is illustrated for the sake of clarity of presentation. In the example of FIG. 4, predicted primitive intersection information 402 may be generated as those primitives that overlap a bounding box associated with a tile. For example, for frame 302, predicted primitive intersection information 402 may include, for individual tiles, not only primitives that overlap the tile but also primitives that overlap a region around the tile. For example, predicted primitive intersection information 322 may be generated via intersection information logic 104 of tile engine 103 or other logic of tile engine 103 or graphics logic 101.

For example, predicted primitive intersection information 402 may include a listing of tiles 303-306 (labeled as tiles T1-T4 in the table) and corresponding bounding box overlapping primitives of primitives 307-310. For example, for tile 303 (T1)/bounding box 401 primitive 307 (P1) and primitive 308 (P2) are overlapping, for tile 304 (T2) and its bounding box (not shown) only primitive 308 (P3) is overlapping, for tile 305 (T3) and its bounding box (not shown) only primitive 309 (P3) is overlapping, and for tile 306 (T4) and its bounding box (not shown) primitives 309 (P3) and 310 (P4) are overlapping. Such information is reflected in predicted primitive intersection information 402. As shown with respect to primitive 309, a primitive may overlap with one or more tiles/bounding boxes (e.g., 1, 2, 3, or 4 tiles if the tiles are organized in a grid as shown). As discussed, predicted primitive intersection information 402 may include, for individual tiles, not only primitives that overlap the tile but also primitives that overlap a region around the tile. Such a technique may reduce errors as discussed herein.

For example, FIG. 4 illustrates primitive intersection information 321 for frame 302 (e.g., frame N+1) based on tiles 303-306 and primitives 307-310, which may be generated as discussed with respect to primitive intersection information 320. As shown, primitive intersection information 321 may include spatial relationship information between tiles 311-314 and primitives 307-310. As shown, in some examples, primitive intersection information 321 may be provided as a table (e.g., a table listing tiles and primitives covering those tiles) although primitive intersection information 321 may include any suitable data structure. As shown, primitive intersection information 321 may include a listing of tiles 311-314 (labeled as tiles T1-T4 in the table) and corresponding overlapping primitives of primitives 307-310. As discussed, primitives 307-310 may move between frames as shown via movement of primitives 308 and 309 and, although not shown in FIG. 4, new primitives may be included in frame 302 and/or some primitives may be lost. For example, as shown, for tile 311 (T1) primitives 307 (P1) and 308 (P2) are overlapping, for tile 312 (T2) only primitive 308 (P3) is overlapping, for tile 313 (T3) only primitive 309 (P3) is overlapping, and for tile 314 (T4) primitives 309 (P3) and 310 (P4) are overlapping. Such information is reflected in primitive intersection information 321. As shown with respect to match 403, bounding boxes such as bounding box 401 may reduce the error of a primitive or primitives not being predicted for a particular tile. In some examples, bounding boxes such as bounding box 401 may increase the error of non-overlapping primitives being included for a particular tile. Such errors may be eliminated during culling operations, for example.

As discussed, in a prediction mode, predicted primitive intersection information 402 may be used to indicate which primitives are to be rendered for individual tiles. Such rendering may include vertex shading and, as discussed, such predicted primitive intersection information 402 may be updated or corrected for the current frame and/or for subsequent frame prediction. For subsequent frame prediction, such prediction may use bounding box techniques as discussed. As discussed with respect to FIG. 3, in the case of an error where a primitive was not included for a tile, such a primitive may be detected during the updating of predicted primitive intersection information 402 and, after the initial rendering of all tiles, the tile or tiles having missing (e.g., non-predicted primitives) may be re-rendered.

As discussed with respect to FIGS. 3 and 4, predicted primitive intersection information for a frame may be the same as actual primitive intersection information from a previous frame or predicted primitive intersection information for a frame may be based on overlap with bounding boxes around the tiles of a frame (e.g., a more conservative prediction technique may be used). In some examples, operation between such modes (e.g., a copy mode and a conservative mode) and/or between how conservative the conservative mode is (e.g., based on the size or shape of bounding box 401 as is discussed further with respect to FIG. 5) may be user selected or determined by the systems discussed herein. Furthermore, the discussed primitive intersection information (e.g., 320, 321) may be stored as primitive intersection information 109, the discussed predicted primitive intersection information (e.g., 322, 402) may be stored as predicted primitive intersection information 110, and the discussed errors (e.g., error 323) may be stored as error information 111.

FIG. 5 illustrates an example margin size for a bounding box and an example chart of error rate versus margin size, arranged in accordance with at least some implementations of the present disclosure. As shown in FIG. 5, borders of bounding box 401 may extend beyond edges of tile 303 by a margin size 501. Margin size 501 may be any suitable size such as 8, 16, 32, or 64 pixels, or the like. As shown, in some examples, margin size 501 may be the same around all edges of tile 303. In other examples, margin size 501 may be different at different edges of tile 303. For example, vertical margins and horizontal margins may be different, top and bottom margins may be different, left and right margins may be different, or the like. Such differences in margin size may capture additional primitives in situations where motion is predictable (e.g., from left to right and top to bottom or the like).

Furthermore, as discussed, bounding box 401 around tile 303 may reduce missing primitive errors in predicted primitive intersection information such as predicted primitive intersection information 402. As shown, chart 500 illustrates example error rate 502 versus margin size 501. The example of chart 500 provides for a tile size of 256×256 pixels, a screen resolution of 1920×1080 pixels, and a frame interval of 40 milliseconds for a graphics rendering benchmark. As shown, error rate 502 may decrease from about 9.5% with no margin (e.g., a margin size 501 of 0) to about 1.2% with a margin of 64 pixels.

As discussed, frames may be rendered in an initialization mode such that actual primitive intersection information may be determined prior to rendering the frame on a tile-by-tile basis or frames may be rendered in a prediction mode such that predicted primitive intersection information generated using a previous frame is used to render the frame on a tile-by-tile basis (and any tiles having errors are re-rendered as needed).

Figure 6:
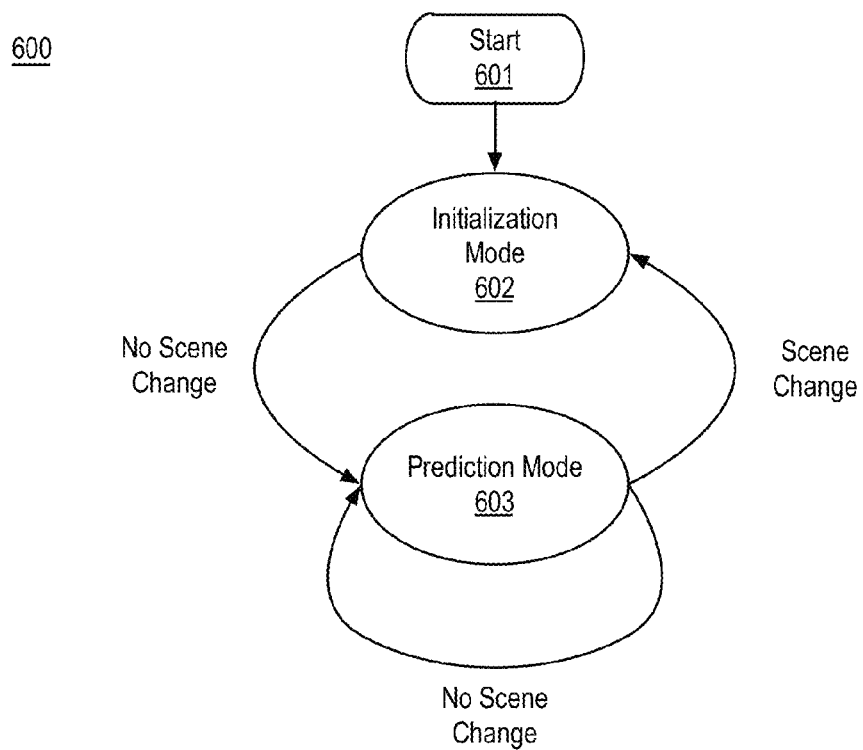
FIG. 6 illustrates an example process for transitioning between frame processing modes.

FIG. 6 illustrates an example process 600 for transitioning between frame processing modes, arranged in accordance with at least some implementations of the present disclosure. Process 600 may include one or more operations or modes 601-603 as illustrated in FIG. 6. Process 600 may be performed by a device or system (e.g., system 100), logic, or a driver (e.g. render mode driver 107). Process 600 may be used to determine a processing mode for frames of a scene, for example. For example, process 600 may be performed by render mode driver based on data stored via memory 108 such as error information 111, drawcall patterns 112, and/or other attributes of frames of a scene.

As shown, process 600 may begin from start operation 601 at initialization mode 602. For example, a first or starting frame or the like may always run in initialization mode since no predicted primitive intersection information may be available and initialization may be required. As shown, the first or starting frame may be processed in initialization mode 602 as discussed herein and, in particular, with respect to FIG. 7 to generate predicted primitive intersection information for a next frame and to render the first or starting frame. During or after processing the first or starting frame or any other frame processed in initialization mode 602, a determination may be made as to whether a subsequent or next frame is a scene change frame. As shown, if the subsequent or next frame is not determined to be a scene change frame, process 600 may process the subsequent or next frame in a prediction mode 603. If the subsequent or next frame is determined to be a scene change frame, process 600 may process the subsequent or next frame in initialization mode 602.

Figure 8:
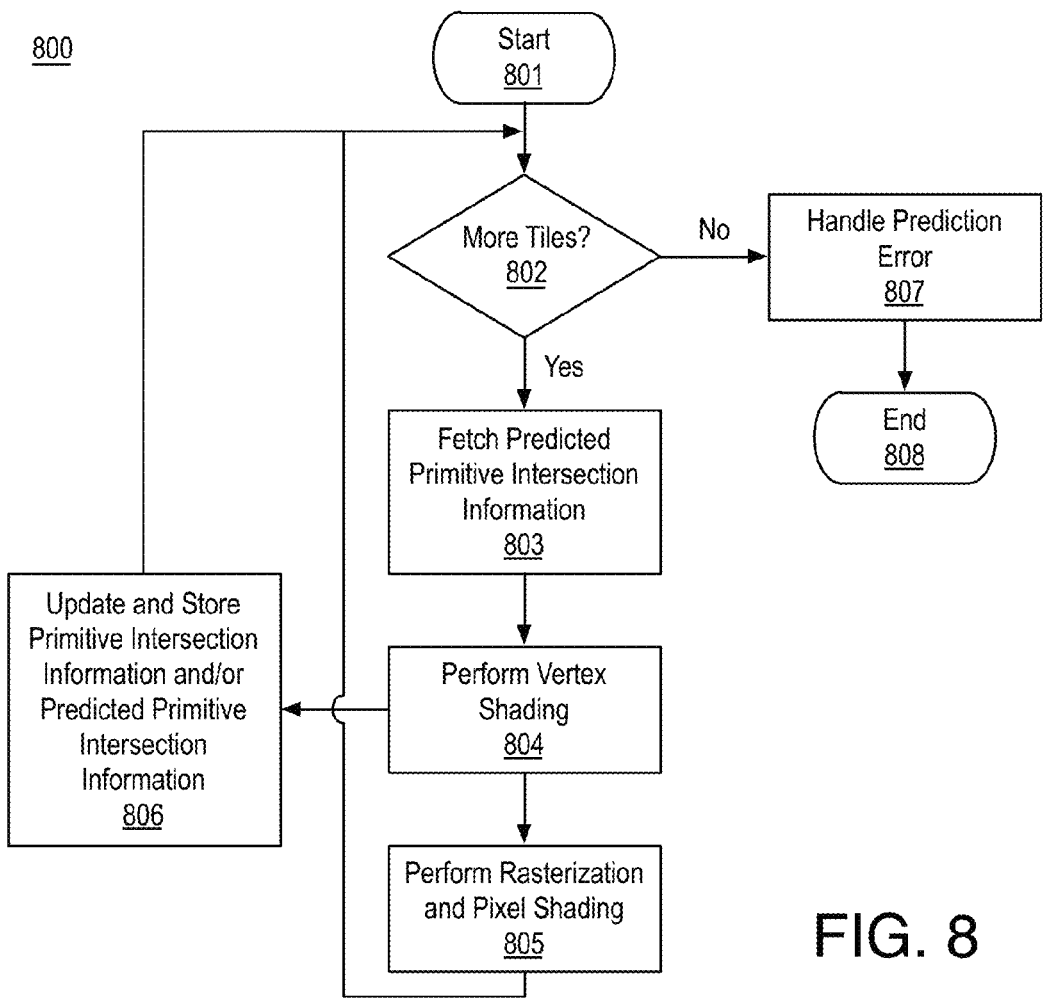
FIG. 8 illustrates an example process for rendering a frame in a prediction mode.

At prediction mode 603, the frame may be processed as discussed herein and, in particular, with respect to FIG. 8 to render the frame on a tile-by-tile basis using the predicted primitive intersection information (and re-rendering of error tiles as needed) and to update the predicted primitive intersection information for a next frame. During or after processing the current frame in prediction mode 603, a determination may be made as to whether a subsequent or next frame is a scene change frame. As shown, if the subsequent or next frame is not determined to be a scene change frame, process 600 may process the subsequent or next frame in prediction mode 603 (e.g., processing may continue in prediction mode 603). If the subsequent or next frame is determined to be a scene change frame, process 600 may process the subsequent or next frame in initialization mode 602. Process 600 may continue until a last frame for processing is completed.

In process 600, processing of the frame may be performed as discussed herein via graphics logic 101 and the processing mode may be determined on the driver level via render mode driver 107. The determination between processing in initialization mode 602 and prediction mode 603 may be made using any suitable technique or techniques. In some examples, one or more attributes of the current frame and the subsequent frame may be compared to determine a scene change. The attribute(s) may be any suitable attribute(s) such as texture information, error information, or drawcall patterns, with drawcall patterns being particularly advantageous due to ease of implementation. Typically, a greater difference in attribute(s) between frames may indicate a scene change. In some examples, the difference in attribute(s) may be quantified and compared to a predetermined or heuristically determined threshold. In some examples, a module run on a driver level (e.g., render mode driver 107) may compare a drawcall pattern of a current frame with a drawcall pattern of a previous frame to determine a processing mode. As discussed, the frame processing (e.g., in initialization or prediction mode) may be performed by hardware such as graphics logic 101.

As shown, in some examples, render mode driver 107 may implement process 600 to determine a frame processing mode based on a frame by frame evaluation. In some examples, render mode driver 107 may implement saturating counter state machine or the like. Furthermore, the discussed attributes may be combined to determine a processing mode. For example, drawcall pattern information and prediction error information (e.g., error information 111 or the like) may be merged (e.g., by render mode driver 107) to determine a mode for a next frame.

As discussed, frames of a scene may be processed or rendered in an initialization mode or a prediction mode.

Figure 7:
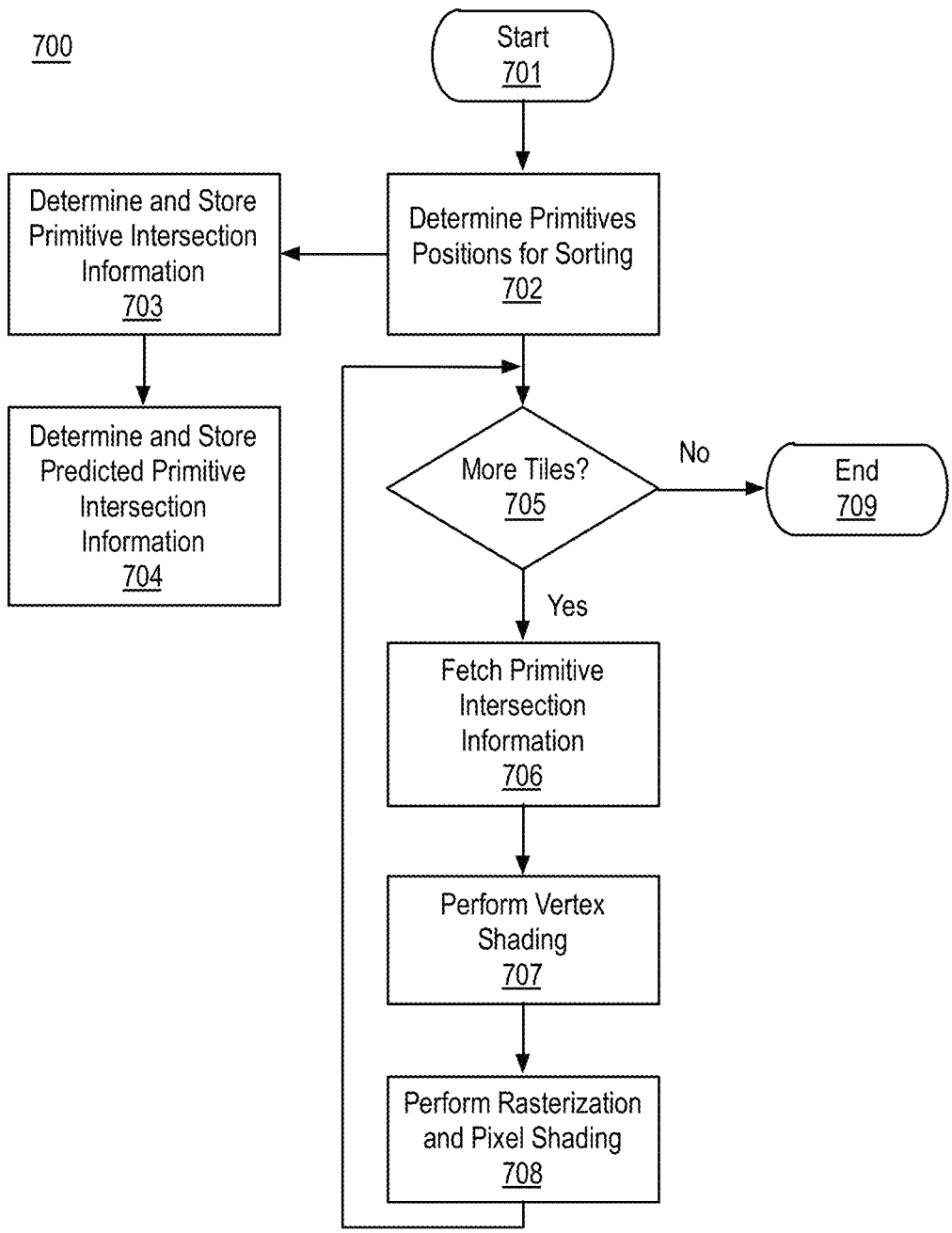
FIG. 7 illustrates an example process for rendering a frame in an initialization mode.

FIG. 7 illustrates an example process 700 for rendering a frame in an initialization mode, arranged in accordance with at least some implementations of the present disclosure. Process 700 may include one or more operations 701-709 as illustrated in FIG. 7. Process 700 may be performed by a device or system (e.g., system 100), logic, or the like. Process 700 may be used to render a frame on a tile-by-tile basis and to determine predicted primitive intersection information for a subsequent frame.

As shown, process 700 may begin from start operation 701 at operation 702, "Determine Primitives Positions for Sorting", where the position of primitives of the frame may be determined for sorting on a tile basis (e.g., to determine which primitives overlap individual tiles of the frame). For example, operation may include performing vertex shading or a portion of vertex shading for primitives of the frame via vertex shader 102. As discussed, operation 702 may require loading and rendering via vertex shading each vertex of primitives of the frame. As discussed, operation 702 may include full vertex shading or the portion vertex shading that determines vertex positions or similar operations.

Process 700 may continue at operation 703 and decision operation 705. At operation 703, "Determine and Store Primitive Intersection Information", primitive intersection information for the current frame (e.g., the initialization mode frame) may be determined. For example, the primitive intersection information may include the spatial relationship information between tiles and primitives for the current frame as discussed with respect to primitive intersection information 320, 321 and elsewhere herein. In some examples, the primitive intersection information may be implemented via a table although other data structures may be used. In some examples, the primitive intersection information may be determined via intersection information logic 104 of tile engine 103 as implemented via graphics logic 101 and stored via memory 108.

Process 700 may continue at operation 704, "Determine and Store Predicted Primitive Intersection Information", where predicted primitive intersection information for a subsequent frame may be determined and stored. As discussed with respect to FIG. 3, in some examples, the predicted primitive intersection information for the subsequent frame may match the primitive intersection information for the current frame. In such examples, the primitive intersection information determined and stored at operation 703 may be retained for subsequent frames. In other examples, as discussed with respect to FIG. 4, the predicted primitive intersection information may be determined based on a bounding box around each tile of the frame. In such examples, the predicted primitive intersection information may include some additional primitives for various tiles as compared to the primitive intersection information determined at operation 703. In some examples, the predicted primitive intersection information may be determined via intersection information logic 104 of tile engine 103 as implemented via graphics logic 101 and stored via memory 108.

As discussed, process 700 may also continue from operation at 702 at decision operation 705, "More Tiles", where a determination may be made as to whether there are more tiles for processing. For example, when a last tile has been processed, process 700 may end at ending operation 709.

If one or more tiles require processing, process 700 may continue at operation 706, "Fetch Primitive Intersection Information", where primitive intersection information may be fetched or retrieved for the current tile. For example, a portion of primitive intersection information 109 pertinent to the current tile may be fetched from memory 108 by graphics logic 101. As discussed, the primitive intersection information for the current tile may indicate the primitives that are to be rendered for the current tile.

Process 700 may continue at operation 707, "Perform Vertex Shading", and operation 708, "Perform Rasterization and Pixel Shading", where vertex shading may be performed for the current tile and rasterization and pixel shading for the current tile may be performed. Furthermore, process 700 may include other graphics processes such as hull shading, a tessellation, domain shading, geometry shading, culling, or the like, which is not shown for the sake of clarity of presentation. As discussed, at operation 707, a second pass of vertex shading may be performed for the primitives of the current tile based on the sorting performed at operation 703. For example, operation 707 may be performed by vertex shader 102 as implemented via graphics logic 101. Furthermore, portions of operation 708 may be performed by rasterizer 105 and/or pixel shader 106 as implemented via graphics logic 101.

As shown, process 700 may continue at decision operation 705, where continued processing may be performed for any remaining tiles or process 700 may end. Process 700 may be repeated for any number of frames processed in an initialization mode. Furthermore, as discussed, process 700 may provide for predicted primitive intersection information (e.g., as discussed with respect to operation 704) for a subsequent frame processed in a prediction mode.

FIG. 8 illustrates an example process 800 for rendering a frame in a prediction mode, arranged in accordance with at least some implementations of the present disclosure. Process 800 may include one or more operations 801-808 as illustrated in FIG. 8. Process 800 may be performed by a device or system (e.g., system 100), logic, or the like. Process 800 may be used to render a frame on a tile-by-tile basis and to determine or update predicted primitive intersection information for a subsequent frame.

As shown, process 800 may begin from start operation 801 at decision operation 802, "More Tiles", where a determination may be made as to whether there are more tiles for processing. For example, when a last tile has been processed, process 700 may continue at operation 807, as is discussed further below.

If one or more tiles require processing, process 800 may continue at operation 803, "Fetch Predicted Primitive Intersection Information", where predicted primitive intersection information may be fetched or retrieved for the current tile. For example, a portion of predicted primitive intersection information 110 pertinent to the current tile may be fetched from memory 108 by graphics logic 101. The predicted primitive intersection information may have been determined as discussed with respect to FIG. 7 or as discussed with respect operation 806 below. As discussed, the predicted primitive intersection information for the current tile may indicate the primitives that are to be rendered for the current tile. Furthermore, the predicted primitive intersection information as fetched at operation 803 may eliminate a first pass of vertex shading to sort primitives to tiles for the current frame.

Process 800 may continue at operation 804, "Perform Vertex Shading", and operation 805, "Perform Rasterization and Pixel Shading", where vertex shading may be performed for the current tile and rasterization and pixel shading for the current tile may be performed. Further, process 800 may include other graphics processes such as hull shading, a tessellation, domain shading, geometry shading, culling, or the like, which is not shown for the sake of clarity of presentation. As discussed, at operation 804, a first pass of vertex shading may be performed for the primitives of the current tile based on the predicted primitive intersection information as fetched at operation 803. For example, operation 804 may be performed by vertex shader 102 as implemented via graphics logic 101. Furthermore, portions of operation 805 may be performed by rasterizer 105 and/or pixel shader 106 as implemented via graphics logic 101.

Furthermore, as shown, process 800 may continue from operation 804 at operation 806, "Update and Store Primitive Intersection Information and/or Predicted Primitive Intersection Information", where primitive intersection information and/or predicted primitive intersection information may be updated and stored. For example, during the vertex shading of an individual tile, vertex shading may be performed for one or more primitives (e.g., for primitives indicated based on the predicted primitive intersection information). Such vertex shading may provide location information for the one or more primitives. Based on the location of the primitives, a determination may be made as to which tiles the primitives overlap (e.g., actually overlap for the current frame as contrasted with the predicted overlap). If such actual overlap matches the predicted overlap, no update or change may be made. However, if the actual overlap does not match the predicted overlap, an update (e.g., to another tile or the current tile) may be made. For example, at operation 806 primitive intersection information (e.g., actual overlaps) may be determined and stored such that error information may be determined such as error information 111 or the like. Such error information may be used at operation 807 to determine which, if any, tiles need to be re-rendered.

Furthermore, in some examples, such updated primitive intersection information may be used as predicted primitive intersection information for a frame subsequent to the current frame. In other examples, the predicted primitive intersection information may be updated or generated based on a bounding box around an individual tile as discussed with respect to FIG. 4. For example, at operation 806, the primitive intersection information for the current frame may be determined via intersection information logic 104 of tile engine 103 as implemented via graphics logic 101 and stored via memory 108 and/or the predicted primitive intersection information for use by a subsequent frame may be determined via intersection information logic 104 of tile engine 103 as implemented via graphics logic 101 and stored via memory 108.

As shown, process 800 may continue from operations 805 and 806 at decision operation 802, where continued processing may be performed for any remaining tiles as discussed via operations 803-806, or process 800 may continue at operation 807, "Handle Prediction Error", where prediction errors) may be handled. For example, for any tile or tiles that were rendered with missing primitives (e.g., the predicted primitive intersection information was missing a primitive for the particular tile, please refer to error 323 as illustrated in FIG. 3), the tile or tiles may be re-rendered. For example, the tile or tiles may be re-rendered with the previously missing primitives as discussed with respect to operations 804 and 805 and any additional graphics processes (e.g., hull shading, a tessellation, domain shading, geometry shading, culling, or the like). During such re-rendering, no updates to the primitive intersection information and/or predicted primitive intersection information may need to be made as such updates may have been previously performed on a tile-by-tile basis at operation 806.

As shown, process may continue from operation 807 at ending operation 808. Process 800 may be repeated for any number of frames processed in a prediction mode. Furthermore, as discussed, process 800 may provide for predicted primitive intersection information (e.g., as discussed with respect to operation 806) for a subsequent frame processed in a prediction mode. Also, processes 700 and 800 may be performed for various frames as determined via process 600 by render mode driver 107, for example.

Figure 9:
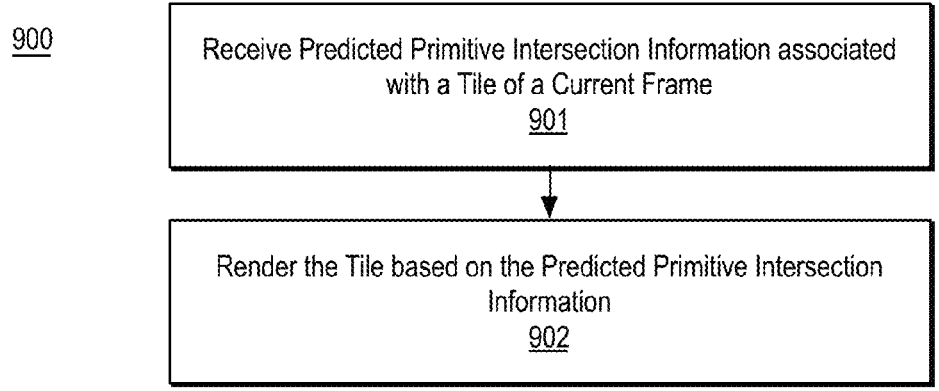
FIG. 9 is a flow diagram illustrating an example process for providing graphics rendering.

FIG. 9 is a flow diagram illustrating an example process 900 for providing graphics rendering, arranged in accordance with at least some implementations of the present disclosure. Process 900 may include one or more operations 901-902 as illustrated in FIG. 9 or other operations as discussed below. Process 900 may form at least part of a graphics rendering process. By way of non-limiting example, process 900 may form at least part of graphics rendering processing with tile-primitives intersection prediction as undertaken by systems 100, 200, 1000, or 1100 as discussed herein. Further, process 900 will be described herein in reference to system 1000 of FIG. 10.

Figure 10:
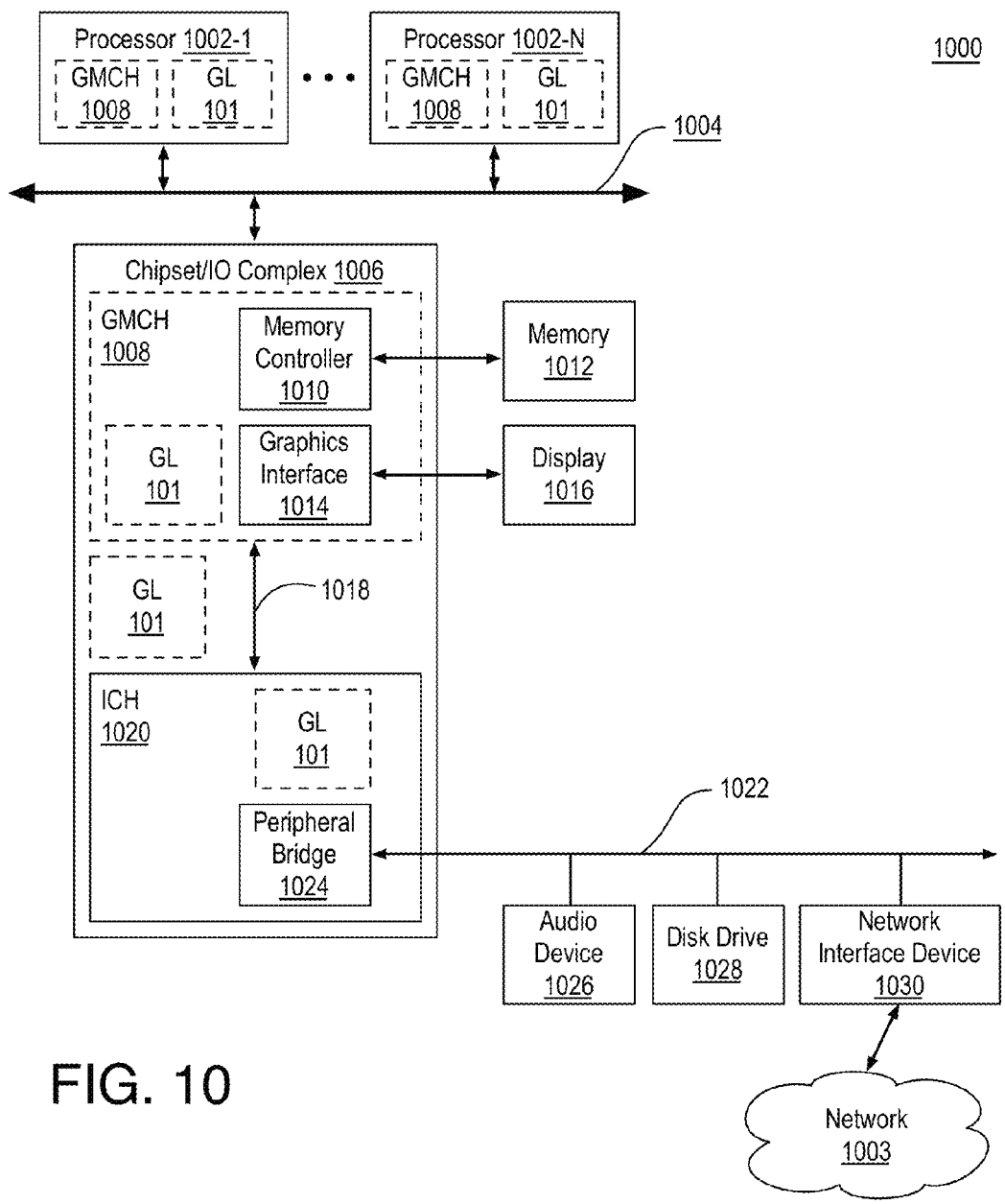
FIG. 10 is a block diagram of an example system for providing graphics rendering.

FIG. 10 is a block diagram of an example system 1000 for providing graphics rendering, arranged in accordance with at least some implementations of the present disclosure. As shown, system 1000 may include one or more processors 1002 (e.g., processors 1002-1 . . . 1002-N), which may include any heterogeneous computing resources such as central processing units (CPUs), CPU cores, graphics processing units (GPUs), GPU cores, network processors (e.g., that process data communicated over a network 1003), reduced instruction set computing (RISC) processors, a complex instruction set computing (CISC) processors, or the like. As shown, processors 1002 may communicate via an interconnection network (or bus) 1004. Furthermore, processors 1002 may have a single or multiple core architecture. Processors 1002 with a multiple core architecture may integrate different types of processor cores on the same integrated circuit (IC) die and/or such processors may be implemented as symmetrical or asymmetrical multiprocessors. As shown, graphics logic 101 may be implemented via one or more of processors 1002.

As shown, a chipset (chipset/IO complex) 1006 may also communicate with the interconnection network 1004. Chipset 1006 may include a graphics memory control hub (GMCH) 1008, which may be implemented via various components of system 1000 as shown. GMCH 1008 may include a memory controller 1010 configured to communicate with a memory 1012. Memory 1012 may store data, including sequences of instructions, that may be executed by via processors 1002 and/or graphics data as discussed herein. In some examples, memory 1012 may include one or more volatile storage (or memory) devices such as random access memory (RAM), dynamic RAM (DRAM), synchronous DRAM (SDRAM), static RAM (SRAM), or other types of storage devices and, in other examples, memory 1012 may include nonvolatile memory such as a hard disk or the like. GMCH 1008 may also include a graphics interface 1014 configured to communicate with a display 1016 via an accelerated graphics port (AGP) or Peripheral Component Interconnect (PCI) interface, or the like. Furthermore, a hub interface 1018 may allow GMCH 1008 and an input/output control hub (ICH) 720 to communicate. ICH 1020 may provide an interface to I/O device(s) that communicate with the system 1000. The ICH 1020 may communicate with a bus 1022 through a peripheral bridge (or controller) 1024, such as a peripheral component interconnect (PCI) bridge, a universal serial bus (USB) controller, or the like. Bridge 1024 may provide a data path between the processors 1002 and peripheral devices. Buss 722 may provide communication with an audio device 1026, one or more disk drive(s) 1028, and a network interface device 1030, or other devices such as integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

As shown, graphics logic 101 may be implemented via one or more of processors 1002 and/or chipset 1006. Graphics logic 101, as discussed with respect to FIG. 1 may include vertex shader 102, tile engine 103, rasterizer 105, pixel shader, or other components as discussed herein. In some examples, graphics logic 101 may at least partially be hardware logic. Furthermore, although not illustrated in FIG. 10, render mode driver 107 may be also be implemented via one or more of processors 1002 and chipset 1006. Furthermore, system 1000 may implement a parameter buffer free tile based rendering system.

Returning to FIG. 9, process 900 may begin at operation 901, "Receive Predicted Primitive Intersection Information associated with a Tile of a Current Frame", where predicted primitive intersection information associated with at least a tile of a frame may be received. For example, the predicted primitive intersection information may indicate one or more primitives predicted to overlap the tile. For example, the predicted primitive intersection information may be received by graphics logic 101 via memory 1012. For example, graphics logic 101 may be configured to receive predicted primitive intersection information associated with at least a tile of a frame. As discussed with respect to FIG. 3, in some examples, the predicted primitive intersection information may indicate a first primitive that overlaps a previous tile from a previous frame with respect to the frame such that the tile and the previous tile correspond (e.g., they are in the same location in of different frames). In other examples, as discussed with respect to FIG. 4, the predicted primitive intersection information may indicate a first primitive that overlaps a bounding box around the previous corresponding tile.

Process 900 may continue at operation 902, "Render the Tile based on the Predicted Primitive Intersection Information", where the tile may be rendered based at least in part on the predicted primitive intersection information. For example, a first primitives sorting may be skipped or avoided and rendering may be performed based on the predicted primitive intersection information as discussed herein. For example, graphics logic 101 may be configured to render the tile based on the predicted primitive intersection information via vertex shader 102, tile engine 103, rasterizer 105, pixel shader, or other components as discussed herein.

In some examples, process 900 may be performed in a prediction mode as discussed herein. For example, a central processing unit such as one or more of processors 1002 may implement a device driver such as render mode driver 107, which may be configured to determine the prediction mode for the frame based on a comparison of attributes for the frames. For example, a frame prior to the frame currently being processed may have been processed in an initialization mode to generate the predicted primitive intersection information. The prior frame being processed in the initialization mode may have been determined based on a comparison of drawcall patterns and/or other attributes of the prior frame to still prior frame(s) (e.g., a comparison of a first drawcall pattern of the prior frame to a second drawcall pattern of a frame prior to the prior frame). Furthermore, the prior frame may have been rendered on a tile-by-tile basis based on the primitive intersection information of that frame.

As discussed, in addition to operation 902, actual primitive intersection information may be generated for the frame and compared to the predicted primitive intersection information. Any tiles with errors) may be re-rendered as discussed herein and the updated predicted primitive intersection information may be used for the prediction of subsequent frames. Furthermore, in some examples, primitive position information may be generated the vertex shading portion of rendering and such primitive position information may be used with a bounding box around tiles of the frame to generate predicted primitive position information for subsequent frames. For example, process 900 may include updating the predicted primitive intersection information for a frame subsequent to the frame based on the discussed vertex shading. In some examples, a second tile of the frame may be rendered including vertex shading a primitive (e.g., a first primitive) not in the one or more primitives associated with the tile and it may be determined that the first primitive overlaps the tile (e.g., the first primitive was unpredicted for the tile). In such examples, as discussed, the tile may be re-rendered based on determining the first primitive (e.g., unpredicted primitive) overlaps the tile (e.g., an error was detected). Furthermore, the predicted primitive intersection information may be updated for a subsequent frame to include the first primitive in the one or more primitives.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100, 200, 1000, or 1100, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
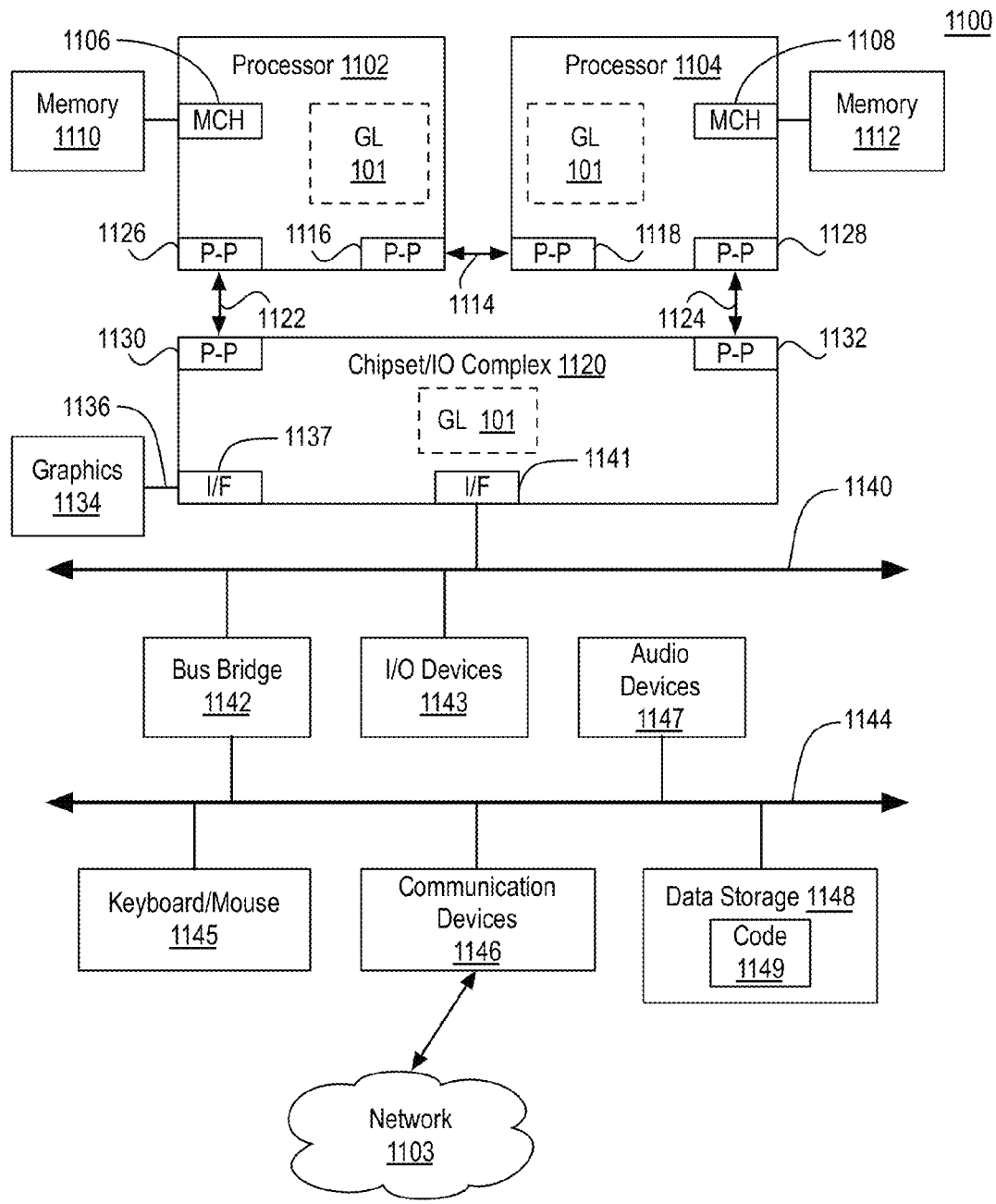
FIG. 11 is a block diagram of a point-to-point computing system.

FIG. 11 illustrates a computing system 1100 that is arranged in a point-to-point (PtP) configuration, according to an embodiment. In particular, FIG. 11 shows a system where processors, memory, and input/output devices are interconnected by a number of point-to-point interfaces. Operations discussed herein such as those discussed with respect to FIGS. 3-9 may be implemented by one or more components of the system 1100. As shown in FIG. 11, system 1100 may include several processors, of which only two, processors 1102 and 1104 are shown for the sake of clarity of presentation. Processors 1102 and 1104 may each include a local memory controller hub (MCH) 1106 and 1108 to enable communication with memories 1110 and 1112. Memories 1110 and/or 1112 may store various data such as those discussed herein including primitive intersection information 109, predicted primitive intersection information 110, error information 111, drawcall patterns 112 (or other attributes), or the like.

In an embodiment, the processors 1102 and 1104 may be one of processors 202 or 1002 discussed with reference to FIGS. 2 and 10. Processors 1102 and 1104 may exchange data via a point-to-point (PtP) interface 1114 using PtP interface circuits 1116 and 1118, respectively. Also, the processors 1102 and 1104 may each exchange data with a chipset 1120 via individual PtP interfaces 1122 and 1124 using point-to-point interface circuits 1126, 1128, 1130, and 1132. The chipset 1120 may further exchange data with a graphics circuit 1134 via a graphics interface 1136, e.g., using a PtP interface circuit 1137. As shown, graphics logic 101 may be implemented via processors 1102 and/or 1104 and/or chipset 1120. For example, one or more components of system 1100 may include graphics logic 101 as discussed herein. Furthermore, although not shown in FIG. 11, render mode driver 107 may be implemented via processors 1102 and/or 1104 and/or chipset 1120. As shown, chipset 1120 may communicate with a bus 1140 using a PtP interface circuit 1141. Bus 1140 may allow communication with one or more devices, such as a bus bridge 1142 and/or I/O devices 1143. Via a bus 1144, bus bridge 1142 may further allow communication with other devices such as a keyboard/mouse 1145, communication devices 1146 (such as modems, network interface devices, or other communication devices that may communicate with the computer network 1103), audio I/O device 1147, and/or a data storage device 1148. The data storage device 1148 may store code 1149 that may be executed by the processors 1102 and/or 1104, for example.

As discussed, in some embodiments, one or more of the components discussed herein may be embodied in a System On Chip (SoC) device.

Figure 12:
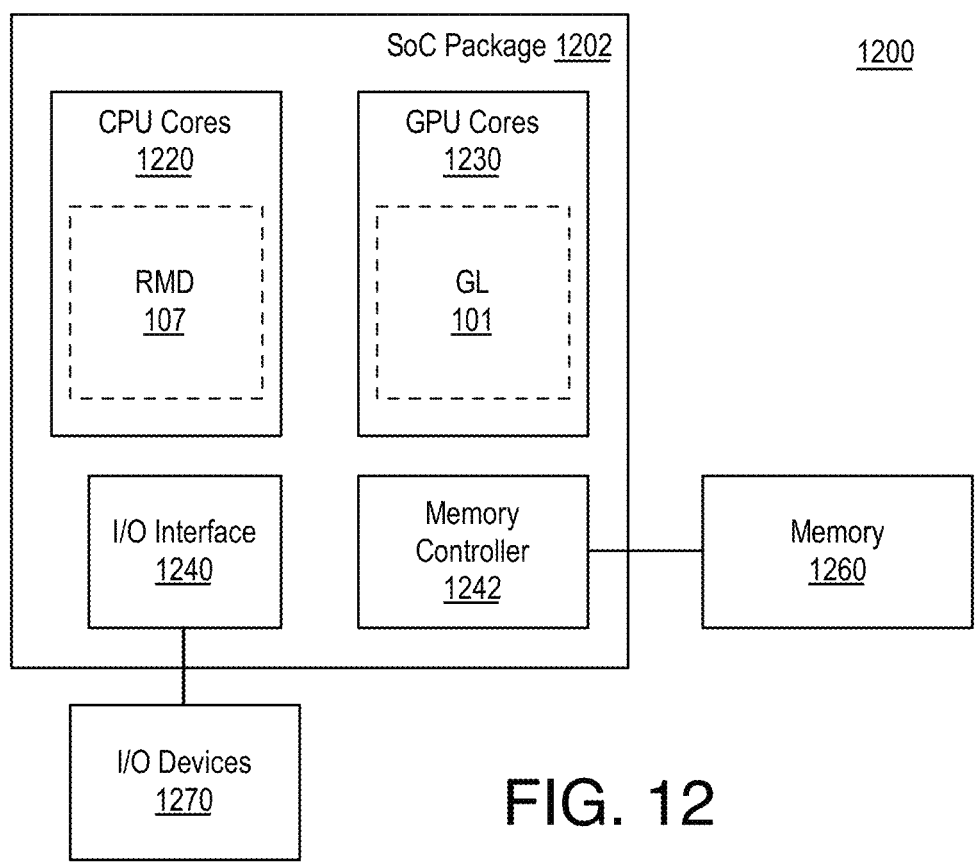
FIG. 12 is a block diagram of an example system on a chip, all arranged in accordance with at least some implementations of the present disclosure.

FIG. 12 is a block diagram of an example system on a chip 1200, arranged in accordance with at least some implementations of the present disclosure. As shown, system on a chip (SoC) may include a SoC package 1202 having one or more Central Processing Unit (CPU) cores 1220, one or more Graphics Processor Unit (GPU) cores 1230, an Input/Output (I/O) interface 1240, and a memory controller 1242. Various components of the SoC package 1202 may be coupled to an interconnect or bus (not shown). In some examples, SoC package 1202 may include additional modules or components such as memory, communications interface(s), controllers, or the like or any modules or components discussed herein. Further, components of SoC package 1202 may each include one or more other components as discussed herein and, in particular, as discussed with respect to FIGS. 2, 10, and 11. In some examples, SoC package 1202 (and its components) is provided on a single IC die.

As shown in FIG. 12, SoC package 1202 may be coupled to a memory 1260, which may provide any graphics data as discussed herein such as primitive intersection information 109, predicted primitive intersection information 110, error information 111, and/or drawcall patterns 112 (or other attributes) via memory controller 1242. In an embodiment, memory 1260 (or a portion of it) may be integrated on SoC package 1202. As shown, I/O interface 1240 may be coupled to one or more I/O devices 1270, for example, via an interconnect and/or bus. I/O device(s) 1270 may include one or more of a keyboard, a mouse, a touchpad, a display, an image/video capture device (such as a camera or camcorder/video recorder), a touch screen, a speaker, or the like.

As discussed, techniques discussed herein, as implemented via a graphics rendering system may provide for techniques that are less computationally intensive and require less memory movement. For example, on a system on a chip GPU and using a typical benchmark graphics test, the average number of vertexes number per is about 1.5 million. With a rate of rendering 75 million vertices per second, about 12 gigabits per second (Gbps) of vertex load memory bandwidth may be required for the typical benchmark. As discussed, for prediction mode frames, the techniques discussed herein may eliminate one of two vertex shading operations, saving about 6 Gbps of memory bandwidth. Similarly, one of two vertex shading computations may be saved, which may, considering at least four single-precision floating point operations per vertex, the techniques discussed herein may save 2.4 gigaflops (floating point operations per second) on the typical benchmark. As discussed, the techniques discussed herein may provide some overhead (e.g., re-renderings) due to errors. Assuming a relatively conservative intersection margin size of 16 pixels, the error rate may be about 4% for the typical benchmark. The memory bandwidth to handle such an error rate may be about 6 Gbps×4%=240 Mbps for vertices reloading and about 16 Gbps×4%=640 Mbps for pixel reloading for a total memory bandwidth overhead of 880 Mbps. Similarly, a computation overhead of about 13% (e.g., due to the extra margin of tiles) for recalculating vertex positions may provide 2.4 Gflops×13%=312 Mflops of computational overhead and re-rendering pixels may provide 10 Gflops×4%=400 Mflops of computational overhead for a total computational overhead of 712 Mflops. Based on such savings and costs, a memory bandwidth savings of 6 Gbps may be compared to a memory bandwidth cost of 880 Mbps for a total memory bandwidth savings of 5.12 Gbps and a computational savings of 2.4 Gflops may be compared to a computational cost of 712 Mflops for a total computational savings of 1.688 Gflops. Such benefits may provide substantial enhancements for graphics rendering in various systems.

Systems discussed herein may provide tile-primitives prediction for tile based rendering. Such systems may be implemented via a variety of platforms or form factors such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet, smart watch, smart glasses or smart television), mobile internet device (MID), messaging device, data communication device, cameras (e.g. point-and-shoot cameras, super-zoom cameras, digital single-lens reflex (DSLR) cameras), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, an apparatus comprises logic, the logic at least partially comprising hardware logic, to receive predicted primitive intersection information associated with at least a tile of a frame, wherein the predicted primitive intersection information indicates one or more primitives predicted to overlap the tile, and to render the tile based at least in part on the predicted primitive intersection information.

Further to the first embodiments, the predicted primitive intersection information indicates at least a first primitive that overlaps a second tile of a second frame, wherein the second tile corresponds to the tile and the second frame is prior to the frame.

Further to the first embodiments, the predicted primitive intersection information indicates at least a first primitive that overlaps a bounding box around a second tile of a second frame, wherein the second tile corresponds to the tile and the second frame is prior to the frame.

Further to the first embodiments, the predicted primitive intersection information indicates at least a first primitive that overlaps a second tile of a second frame, wherein the second tile corresponds to the tile and the second frame is prior to the frame, and/or the predicted primitive intersection information indicates at least a first primitive that overlaps a bounding box around a second tile of a second frame, wherein the second tile corresponds to the tile and the second frame is prior to the frame Further to the first embodiments, the logic to render the tile comprises the logic to perform vertex shading for a first primitive of the one or more primitives, and wherein the logic is further to update the predicted primitive intersection information for a second frame subsequent to the frame based at least in part on the vertex shading.

Further to the first embodiments, the logic further to render a second tile of the frame, wherein the logic to render the second tile comprises the logic to perform vertex shading for a first primitive not included in the one or more primitives, to determine the first primitive overlaps the tile, and to re-render the tile based at least in part on the first primitive.

Further to the first embodiments, the logic further to determine the predicted primitive intersection information based on a second frame, wherein the second frame is prior to the frame, and wherein the logic to determine the predicted primitive intersection information comprises the logic to determine intersection information for the second frame based at least in part on a first vertex shading of primitives of the second frame, and the logic further to perform, on a tile-by-tile basis, a second vertex shading of the second frame based on the intersection information for the second frame.

Further to the first embodiments, the apparatus further comprises a graphics processing unit comprising the logic and a central processing unit coupled to the graphics processing unit, the central processing unit to implement a device driver to determine a mode for processing a second frame, wherein the mode comprises at least one of an initialization mode or a prediction mode.

Further to the first embodiments, the apparatus further comprises a graphics processing unit comprising the logic and a central processing unit coupled to the graphics processing unit, the central processing unit to implement a device driver to determine a mode for processing a second frame, wherein the mode comprises at least one of an initialization mode or a prediction mode, wherein the central processing unit to determine the mode comprises the central processing unit to compare a first drawcall pattern associated with the frame to a second drawcall pattern associated with the second frame.

Further to the first embodiments, the apparatus further comprises a graphics processing unit comprising the logic and a central processing unit coupled to the graphics processing unit, the central processing unit to implement a device driver to determine a mode for processing a second frame, wherein the mode comprises at least one of an initialization mode or a prediction mode and/or wherein the central processing unit to determine the mode comprises the central processing unit to compare a first drawcall pattern associated with the frame to a second drawcall pattern associated with the second frame.

Further to the first embodiments, the logic comprises at least one of a vertex shader, a tile engine, intersection information logic, a rasterizer, or a pixel shader, and wherein the apparatus comprises a parameter buffer free tile based graphics system.

Further to the first embodiments, the apparatus further comprises a graphics processing unit comprising the logic and a central processing unit, wherein the graphics processing unit and the central processing unit are in a system on a chip package.

In one or more second embodiments, a computer-implemented method for providing graphics rendering comprises Further to the second embodiments, receiving predicted primitive intersection information associated with at least a tile of a frame, wherein the predicted primitive intersection information indicates one or more primitives predicted to overlap the tile and rendering the tile based at least in part on the predicted primitive intersection information.

Further to the second embodiments, the predicted primitive intersection information comprises at least a first primitives that overlaps a second tile of a second frame, wherein the second tile corresponds to the tile and the second frame is prior to the frame.

Further to the second embodiments, the predicted primitive intersection information indicates at least a first primitive that overlaps a bounding box around a second tile of a second frame, wherein the second tile corresponds to the tile and the second frame is prior to the frame.

Further to the second embodiments, the predicted primitive intersection information indicates at least a first primitive that overlaps a second tile of a second frame, wherein the second tile corresponds to the tile and the second frame is prior to the frame, and/or the predicted primitive intersection information indicates at least a first primitive that overlaps a bounding box around a second tile of a second frame, wherein the second tile corresponds to the tile and the second frame is prior to the frame.

Further to the second embodiments, rendering the tile comprises performing vertex shading for a first primitive of the one or more primitives, the method further comprising updating the predicted primitive intersection information for a second frame subsequent to the frame based at least in part on the vertex shading.

Further to the second embodiments, the method further comprises rendering a second tile of the frame, wherein rendering the second tile comprises performing vertex shading for a first primitive not included in the one or more primitives, determining the first primitive overlaps the tile, re-rendering the tile based at least in part on determining the first primitive overlaps the tile, and updating the predicted primitive intersection information for a second frame subsequent to the frame to include the first primitive in the one or more primitives.

Further to the second embodiments, the method further comprises rendering a second tile of the frame, wherein rendering the second tile comprises performing vertex shading for a first primitive not included in the one or more primitives, determining the first primitive overlaps the tile, and updating the predicted primitive intersection information for a second frame subsequent to the frame to include the first primitive in the one or more primitives.

Further to the second embodiments, the method further comprises rendering a second tile of the frame, wherein rendering the second tile comprises performing vertex shading for a first primitive not included in the one or more primitives, determining the first primitive overlaps the tile, and re-rendering the tile based at least in part on determining the first primitive overlaps the tile and/or updating the predicted primitive intersection information for a second frame subsequent to the frame to include the first primitive in the one or more primitives.

Further to the second embodiments, the method further comprises determining an unpredicted primitive overlaps the tile and re-rendering the tile based at least in part on the on the unpredicted primitive.

Further to the second embodiments, the method further comprises determining the predicted primitive intersection information based on a second frame, wherein the second frame is prior to the frame, and wherein determining the predicted primitive intersection information comprises determining intersection information for the second frame based at least in part on a first vertex shading primitives of the second frame and performing, on a tile-by-tile basis, a second vertex shading of the second frame based on the intersection information for the second frame.

Further to the second embodiments, the second frame is processed in an initialization mode and the frame is processed in a prediction mode.

Further to the second embodiments, the method further comprises comparing a drawcall pattern of the frame to a previous drawcall pattern of a previous frame to determine a mode for processing the frame, wherein the mode comprises at least one of an initialization mode or a prediction mode.

In one or more third embodiments, a system for providing graphics rendering comprises means for receiving predicted primitive intersection information associated with at least a tile of a frame, wherein the predicted primitive intersection information indicates one or more primitives predicted to overlap the tile and means for rendering the tile based at least in part on the predicted primitive intersection information.

Further to the third embodiments, the predicted primitive intersection information indicates at least a first primitive that overlaps a second tile of a second frame, wherein the second tile corresponds to the tile and the second frame is prior to the frame.

Further to the third embodiments, the predicted primitive intersection information indicates at least a first primitive that overlaps a bounding box around a second tile of a second frame, wherein the second tile corresponds to the tile and the second frame is prior to the frame.

Further to the third embodiments, the system further comprises means for updating the predicted primitive intersection information for a second frame subsequent to the frame based at least in part on the vertex shading.

Further to the third embodiments, the system further comprises means for rendering a second tile of the frame, wherein rendering the second tile comprises performing vertex shading for a first primitive not included in the one or more primitives, means for determining the first primitive overlaps the tile, means for re-rendering the tile based at least in part on determining the first primitive overlaps the tile, and means for updating the predicted primitive intersection information for a second frame subsequent to the frame to include the first primitive in the one or more primitives.

Further to the third embodiments, the system further comprises means for determining an unpredicted primitive overlaps the tile and means for re-rendering the tile based at least in part on the on the unpredicted primitive.

Further to the third embodiments, the system further comprises means for determining the predicted primitive intersection information based on a second frame, wherein the second frame is prior to the frame, and wherein determining the predicted primitive intersection information comprises determining intersection information for the second frame based at least in part on a first vertex shading primitives of the second frame and means for performing, on a tile-by-tile basis, a second vertex shading of the second frame based on the intersection information for the second frame.

Further to the third embodiments, the system further comprises means for comparing at least one first attribute of the frame to at least one second attribute of a subsequent frame to determine a mode for processing the subsequent frame, wherein the mode comprises at least one of an initialization mode or a prediction mode.

In one or more fourth embodiments, a system comprises a processor having one or more processor cores, memory to store graphics data associated with at least one frame of a scene, the memory to be accessed by at least one of the processor cores, a display device to present the frame of the scene, and logic to receive predicted primitive intersection information associated with at least a tile of a frame, wherein the predicted primitive intersection information comprises one or more primitives predicted to overlap the tile, and to render the tile based at least in part on the predicted primitive intersection information.

Further to the fourth embodiments, the predicted primitive intersection information indicates at least a first primitive that overlaps a second tile of a second frame, wherein the second tile corresponds to the tile and the second frame is prior to the frame.

Further to the fourth embodiments, the predicted primitive intersection information indicates at least a first primitive that overlaps a bounding box around a second tile of a second frame, wherein the second tile corresponds to the tile and the second frame is prior to the frame.

Further to the fourth embodiments, the logic to render the tile comprises the logic to perform vertex shading for a first primitive of the one or more primitives, and wherein the logic is further to update the predicted primitive intersection information for a second frame subsequent to the frame based at least in part on the vertex shading.

Further to the fourth embodiments, the logic further to render a second tile of the frame, wherein the logic to render the second tile comprises the logic to perform vertex shading for a first primitive not included in the one or more primitives, to determine the first primitive overlaps the tile, and to re-render the tile based at least in part on the first primitive.

Further to the fourth embodiments, the logic further to determine the predicted primitive intersection information based on a second frame, wherein the second frame is prior to the frame, and wherein the logic to determine the predicted primitive intersection information comprises the logic to determine intersection information for the second frame based at least in part on a first vertex shading of primitives of the second frame, and the logic further to perform, on a tile-by-tile basis, a second vertex shading of the second frame based on the intersection information for the second frame.

Further to the fourth embodiments, the system further comprises a graphics processing unit comprising the logic and a central processing unit coupled to the graphics processing unit, the central processing unit to implement a device driver to determine a mode for processing a second frame, wherein the mode comprises at least one of an initialization mode or a prediction mode.

Further to the fourth embodiments, the central processing unit to determine the mode comprises the central processing unit to compare a first drawcall pattern associated with the frame to a second drawcall pattern associated with the second frame.

Further to the fourth embodiments, the logic comprises at least one of a vertex shader, a tile engine, intersection information logic, a rasterizer, or a pixel shader, and wherein the apparatus comprises a parameter buffer free tile based graphics system.

Further to the fourth embodiments, the system further comprises a graphics processing unit comprising the logic and a central processing unit, wherein the graphics processing unit and the central processing unit are in a system on a chip package.

Further to the fourth embodiments, the processor comprises the logic.

Further to the fourth embodiments, the processor, the memory, and the logic comprises a single integrated circuit die.

In one or more fifth embodiments, at least one machine readable medium comprises a plurality of instructions that, in response to being executed on a computing device, cause the computing device to provide graphics rendering by receiving predicted primitive intersection information associated with at least a tile of a frame, wherein the predicted primitive intersection information indicates one or more primitives predicted to overlap the tile and rendering the tile based at least in part on the predicted primitive intersection information.

Further to the fifth embodiments, the predicted primitive intersection information comprises at least a first primitive that overlaps a bounding box around a second tile of a second frame, wherein the second tile corresponds to the tile and the second frame is prior to the frame.

Further to the fifth embodiments, rendering the tile comprises performing vertex shading for a first primitive of the one or more primitives and the machine readable medium further comprising instructions that, in response to being executed on the computing device, cause the computing device to provide graphics rendering by updating the predicted primitive intersection information for a second frame subsequent to the frame based at least in part on the vertex shading.

Further to the fifth embodiments, the machine readable medium further comprises instructions that, in response to being executed on the computing device, cause the computing device to provide graphics rendering by determining an unpredicted primitive overlaps the tile and re-rendering the tile based at least in part on the on the unpredicted primitive.

Further to the fifth embodiments, the machine readable medium further comprises instructions that, in response to being executed on the computing device, cause the computing device to provide graphics rendering by comparing at least one first attribute of the frame to at least one second attribute of a subsequent frame to determine a mode for processing the subsequent frame, wherein the mode comprises at least one of an initialization mode or a prediction mode.

In one or more sixth embodiments, at least one machine readable medium may include a plurality of instructions that in response to being executed on a computing device, causes the computing device to perform a method according to any one of the above embodiments.

In one or more seventh embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus comprising:
   a memory to receive prediction primitive intersection information associated with at least a first tile of a first frame; and
   logic coupled to the memory, the logic at least partially comprising hardware logic, the logic to access the predicted primitive intersection information, wherein the predicted primitive intersection information indicates one or more primitives predicted to overlap the first tile, to render the first tile based at least in part on the predicted primitive intersection information, to determine an unpredicted primitive overlaps the first tile, and to re-render the first tile based at least in part on the unpredicted primitive.

2. The apparatus of claim 1, wherein the predicted primitive intersection information indicates at least a first primitive that overlaps a second tile of a second frame, wherein the second tile corresponds to the first tile and the second frame is prior to the first frame.

3. The apparatus of claim 1, wherein the predicted primitive intersection information indicates at least a first primitive that overlaps a bounding box around a second tile of a second frame, wherein the second tile corresponds to the first tile and the second frame is prior to the first frame.

4. The apparatus of claim 1, wherein the logic to render the first tile comprises the logic to perform vertex shading for a first primitive of the one or more primitives, and wherein the logic is further to update the predicted primitive intersection information for a second frame subsequent to the first frame based at least in part on the vertex shading.

5. The apparatus of claim 1, the logic further to render a second tile of the first frame, wherein the logic to render the second tile comprises the logic to perform vertex shading for the unpredicted primitive not included in the one or more primitives.

6. The apparatus of claim 1, the logic further to determine the predicted primitive intersection information based on a second frame, wherein the second frame is prior to the first frame, and wherein the logic to determine the predicted primitive intersection information comprises the logic to determine intersection information for the second frame based at least in part on a first vertex shading of primitives of the second frame, and the logic further to perform, on a tile-by-tile basis, a second vertex shading of the second frame based on the intersection information for the second frame.

7. The apparatus of claim 1, further comprising:
a graphics processing unit comprising the logic; and
a central processing unit coupled to the graphics processing unit, the central processing unit to implement a device driver to determine a mode for processing a second frame, wherein the mode comprises at least one of an initialization mode or a prediction mode.

8. The apparatus of claim 7, wherein the central processing unit to determine the mode comprises the central processing unit to compare a first drawcall pattern associated with the first frame to a second drawcall pattern associated with the second frame.

9. The apparatus of claim 1, wherein the logic comprises at least one of a vertex shader, a tile engine, intersection information logic, a rasterizer, or a pixel shader, and wherein the apparatus comprises a parameter buffer free tile based graphics system.

10. The apparatus of claim 1, further comprising:
a graphics processing unit comprising the logic; and
a central processing unit, wherein the graphics processing unit and the central processing unit are in a system on a chip package.

11. A computer-implemented method for providing graphics rendering comprising:
receiving predicted primitive intersection information associated with at least a first tile of a first frame, wherein the predicted primitive intersection information indicates one or more primitives predicted to overlap the first tile;
rendering the first tile based at least in part on the predicted primitive intersection information;
determining an unpredicted primitive overlaps the first tile; and
re-rendering the first tile based at least in part on the on the unpredicted primitive.

12. The method of claim 11, wherein the predicted primitive intersection information indicates at least a first primitive that overlaps a bounding box around a second tile of a second frame, wherein the second tile corresponds to the first tile and the second frame is prior to the first frame.

13. The method of claim 11, wherein rendering the first tile comprises performing vertex shading for a first primitive of the one or more primitives, the method further comprising:
updating the predicted primitive intersection information for a second frame subsequent to the first frame based at least in part on the vertex shading.

14. The method of claim 11, further comprising:
rendering a second tile of the first frame, wherein rendering the second tile comprises performing vertex shading for the unpredicted primitive not included in the one or more primitives; and
updating the predicted primitive intersection information for a second frame subsequent to the first frame to include the unpredicted in the one or more primitives.

15. The method of claim 11, wherein the predicted primitive intersection information indicates at least a first primitive that overlaps a second tile of a second frame, wherein the second tile corresponds to the first tile and the second frame is prior to the first frame.

16. The method of claim 11, further comprising:
determining the predicted primitive intersection information based on a second frame, wherein the second frame is prior to the first frame, and wherein determining the predicted primitive intersection information comprises determining intersection information for the second frame based at least in part on a first vertex shading of primitives of the second frame; and
performing, on a tile-by-tile basis, a second vertex shading of the second frame based on the intersection information for the second frame.

17. The method of claim 11, further comprising:
comparing at least one first attribute of the first frame to at least one second attribute of a subsequent frame to determine a mode for processing the subsequent frame, wherein the mode comprises at least one of an initialization mode or a prediction mode.

18. At least one non-transitory machine readable medium comprising a plurality of instructions that, in response to being executed on a computing device, cause the computing device to provide graphics rendering by:
receiving predicted primitive intersection information associated with at least a first tile of a first frame, wherein the predicted primitive intersection information indicates one or more primitives predicted to overlap the first tile;
rendering the first tile based at least in part on the predicted primitive intersection information;
determining an unpredicted primitive overlaps the first tile; and
re-rendering the first tile based at least in part on the on the unpredicted primitive.

19. The machine readable medium of claim 18, wherein the predicted primitive intersection information comprises at least a first primitive that overlaps a bounding box around a second tile of a second frame, wherein the second tile corresponds to the first tile and the second frame is prior to the first frame.

20. The machine readable medium of claim 18, wherein rendering the first tile comprises performing vertex shading for a first primitive of the one or more primitives, the machine readable medium further comprising instructions that, in response to being executed on the computing device, cause the computing device to provide graphics rendering by:
updating the predicted primitive intersection information for a second frame subsequent to the first frame based at least in part on the vertex shading.

21. The machine readable medium of claim 18, the machine readable medium further comprising instructions that, in response to being executed on the computing device, cause the computing device to provide graphics rendering by:
determining the predicted primitive intersection information based on a second frame, wherein the second frame is prior to the first frame, and wherein determining the predicted primitive intersection information comprises determining intersection information for the second frame based at least in part on a first vertex shading of primitives of the second frame; and performing, on a tile-by-tile basis, a second vertex shading of the second frame based on the intersection information for the second frame.

22. The machine readable medium of claim 18, the machine readable medium further comprising instructions that, in response to being executed on the computing device, cause the computing device to provide graphics rendering by:

comparing at least one first attribute of the first frame to at least one second attribute of a subsequent frame to determine a mode for processing the subsequent frame, wherein the mode comprises at least one of an initialization mode or a prediction mode.

* * * * *